(12) United States Patent
Busby et al.

(10) Patent No.: US 11,976,747 B2
(45) Date of Patent: May 7, 2024

(54) COMPRESSOR UNIT WITH A DAMPED AXIAL CHECK VALVE FOR A DISCHARGE OUTLET

(71) Applicant: Danfoss A/S, Nordborg (DK)

(72) Inventors: Bruce Busby, Nordborg (DK); Michael Birkelund, Nordborg (DK); Johan Van Beek, Nordborg (DK)

(73) Assignee: DANFOSS A/S, Nordborg (DK)

( * ) Notice: Subject to any disclaimer, the term of this patent is extended or adjusted under 35 U.S.C. 154(b) by 280 days.

(21) Appl. No.: 17/440,301

(22) PCT Filed: Jan. 24, 2020

(86) PCT No.: PCT/EP2020/051795
§ 371 (c)(1),
(2) Date: Sep. 17, 2021

(87) PCT Pub. No.: WO2020/187468
PCT Pub. Date: Sep. 24, 2020

(65) Prior Publication Data
US 2022/0154726 A1    May 19, 2022

(30) Foreign Application Priority Data
Mar. 20, 2019    (EP) .................................... 19164084

(51) Int. Cl.
*F16K 15/02* (2006.01)
*F04D 27/02* (2006.01)
(Continued)

(52) U.S. Cl.
CPC ...... *F16K 47/0111* (2021.08); *F04D 27/0292* (2013.01); *F16K 15/026* (2013.01);
(Continued)

(58) Field of Classification Search
CPC .... F16K 15/021; F16K 15/025; F16K 15/026; F16K 15/06; F16K 15/063; F16K 15/064;
(Continued)

(56) References Cited

U.S. PATENT DOCUMENTS 3,134,394 A * 5/1964 Ohta .................. F16K 47/0111
137/220
3,146,792 A * 9/1964 Donnelly ................ F16L 55/46
15/104.062
(Continued)

FOREIGN PATENT DOCUMENTS

CN    101000046 A    7/2007
CN    201031979 Y    3/2008
(Continued)

OTHER PUBLICATIONS

International Search Report for PCT Serial No. PCT/EP2020/051795 dated Apr. 3, 2020.
(Continued)

*Primary Examiner* — Matthew W Jellett
(74) *Attorney, Agent, or Firm* — McCormick, Paulding & Huber PLLC

(57) ABSTRACT

The invention relates to a compressor unit (200) for a refrigeration system using a refrigerant. The compressor (200) unit includes a centrifugal compressor (201) for compressing the refrigerant, wherein the compressor (201) has a discharge outlet (204) for discharging the compressed refrigerant, and a check valve (1; 100; 301*a*). An inlet (83) of the check valve (1; 100; 301*a*) is in fluid connection with the discharge outlet (204) of the compressor (201). In order to provide a more reliable and more quite compressor unit (200), the check valve (1; 100; 301*a*) is a nozzle check valve including a damping mechanism (41, 50; 50, 141), wherein a closing parameter of the check valve (1; 100; 301*a*) is between 50 s/m² and 2000 s/m², wherein the closing param-
(Continued)

eter is a closing time of the check valve (1; 100; 301*a*) divided by a port area of the check valve (1; 100; 301*a*).

19 Claims, 6 Drawing Sheets

(51) Int. Cl.
*F16K 47/00* (2006.01)
*F04D 17/10* (2006.01)
*F04D 29/048* (2006.01)
*F25B 31/00* (2006.01)

(52) U.S. Cl.
CPC .......... *F04D 17/10* (2013.01); *F04D 27/0215* (2013.01); *F04D 29/048* (2013.01); *F25B 31/00* (2013.01)

(58) Field of Classification Search
CPC ............... F16K 15/067; F16K 47/0111; Y10T 137/86019; Y10T 137/7936; F04D 17/10; F04D 27/0215; F04D 27/0292; F04D 29/048; F25B 31/00; F04B 39/10; F04B 39/1013

See application file for complete search history.

(56) References Cited

U.S. PATENT DOCUMENTS

| | | | |
|---|---|---|---|
| 4,271,862 A | 6/1981 | Snoek | |
| 4,693,270 A | 9/1987 | Yaindl | |
| 4,747,426 A | 5/1988 | Weevers | |
| 5,065,790 A * | 11/1991 | Kornas | F16K 47/011 137/538 |
| 5,857,348 A * | 1/1999 | Conry | F04D 29/058 417/423.12 |
| 5,881,564 A * | 3/1999 | Kishimoto | F04D 29/063 62/193 |
| 6,132,191 A * | 10/2000 | Hugenroth | F04C 29/126 137/220 |
| 6,293,513 B1 | 9/2001 | Birkelund | |
| 6,386,089 B2 | 5/2002 | Giversen et al. | |
| 6,405,824 B1 | 6/2002 | Sørensen et al. | |
| 6,459,348 B1 | 10/2002 | Birkelund | |
| 6,668,967 B2 | 12/2003 | Sørensen et al. | |
| 6,814,101 B2 * | 11/2004 | Flauzac | F16K 5/0605 137/543.17 |
| 6,912,455 B2 | 6/2005 | Beek | |
| 6,955,331 B2 | 10/2005 | Larsen et al. | |
| 7,246,525 B2 | 7/2007 | Birkelund et al. | |
| 8,066,256 B2 | 11/2011 | Platz et al. | |
| 8,434,734 B2 | 5/2013 | Birkelund | |
| 8,584,705 B2 * | 11/2013 | Hughes | G01F 23/02 251/192 |
| 8,689,582 B2 | 4/2014 | Birkelund et al. | |
| 9,309,978 B2 | 4/2016 | Hatch et al. | |
| 9,360,027 B2 | 6/2016 | Birkelund | |
| 9,383,031 B2 | 7/2016 | Shelcoviz et al. | |
| 9,416,890 B2 | 8/2016 | Nissen et al. | |
| 9,683,673 B2 | 6/2017 | Gretarsson et al. | |
| 9,739,290 B2 | 8/2017 | Lucas et al. | |
| 10,082,219 B2 | 9/2018 | Birkelund | |
| 10,197,314 B2 | 2/2019 | Birkelund | |
| 10,443,753 B2 | 10/2019 | van Beek et al. | |
| 10,502,333 B2 * | 12/2019 | Rizzio | F16K 15/1823 |
| 10,571,156 B2 | 2/2020 | Birkelund | |
| 10,663,077 B2 | 5/2020 | Birkelund | |
| 10,816,015 B2 | 10/2020 | Birkelund | |
| 10,989,454 B2 | 4/2021 | Uribe et al. | |
| 2006/0130903 A1 * | 6/2006 | Whittaker | F16K 15/063 137/538 |
| 2010/0024891 A1 | 2/2010 | Francini et al. | |
| 2015/0377378 A1 | 12/2015 | Birkelund et al. | |

FOREIGN PATENT DOCUMENTS

| | | |
|---|---|---|
| CN | 101457849 A | 6/2009 |
| CN | 102478119 A | 5/2012 |
| CN | 102486238 A | 6/2012 |
| CN | 102588632 A | 7/2012 |
| CN | 203404430 U | 1/2014 |
| CN | 203477484 U | 3/2014 |
| CN | 103727273 | 4/2014 |
| CN | 203686272 U | 7/2014 |
| CN | 204140963 U | 2/2015 |
| CN | 204553670 U | 8/2015 |
| CN | 205118348 U | 3/2016 |
| CN | 106402433 | 2/2017 |
| CN | 206320363 U | 7/2017 |
| CN | 107567560 A | 1/2018 |
| CN | 208252854 U | 12/2018 |
| CN | 106838386 B | 10/2019 |
| CN | 110608303 A | 12/2019 |
| CN | 110878857 A | 3/2020 |
| CN | 110894877 A | 3/2020 |
| CN | 111043351 A | 4/2020 |
| CN | 210423843 U | 4/2020 |
| CN | 210661524 U | 6/2020 |
| CN | 111365496 A | 7/2020 |
| CN | 211371374 U | 8/2020 |
| CN | 211371375 U | 8/2020 |
| CN | 211474891 U | 9/2020 |
| CN | 211667210 U | 10/2020 |
| CN | 111927988 A | 11/2020 |
| CN | 212080262 U | 12/2020 |
| CN | 212107048 U | 12/2020 |
| CN | 212643659 U | 3/2021 |
| CN | 212718206 U | 3/2021 |
| CN | 212960019 U | 4/2021 |
| CN | 213271164 U | 5/2021 |
| DE | 1 107 038 B | 5/1961 |
| DE | 3142331 A1 | 5/1983 |
| DE | 10255066 A1 | 6/2004 |
| DE | 102005009989 B3 | 6/2006 |
| DE | 102013222764 | 2/2015 |
| EP | 1327810 A2 | 7/2003 |
| EP | 1331426 A2 | 7/2003 |
| EP | 2076940 A1 | 7/2009 |
| EP | 2108869 A2 | 10/2009 |
| EP | 2171731 A1 | 4/2010 |
| EP | 2546559 A1 | 1/2013 |
| EP | 2788640 A | 10/2014 |
| EP | 2818779 A1 | 12/2014 |
| EP | 2944827 A1 | 11/2015 |
| EP | 3098543 A1 | 11/2016 |
| EP | 3106726 A1 | 12/2016 |
| EP | 3499101 A1 | 6/2019 |
| EP | 3591316 A1 | 1/2020 |
| EP | 3660418 A1 | 6/2020 |
| EP | 3660419 A1 | 6/2020 |
| EP | 3712434 A1 | 9/2020 |
| GB | 8303981 | 3/1983 |
| GB | 2117091 | 10/1983 |
| GB | 2117091 A | 10/1983 |
| GB | 2360023 A | 9/2001 |
| GB | 2360024 A | 9/2001 |
| JP | H06341562 A | 12/1994 |
| JP | 2008207482 A | 9/2008 |
| JP | 2012007639 A | 1/2012 |
| JP | 2017-57913 A | 3/2017 |
| KR | 2007-0050524 A | 5/2007 |
| KR | 100727833 B1 | 6/2007 |
| WO | 2006116998 A1 | 11/2006 |
| WO | 2006116999 A1 | 11/2006 |
| WO | 2008040353 A1 | 4/2008 |
| WO | 2008141647 A1 | 11/2008 |
| WO | 2009000271 A1 | 12/2008 |
| WO | 2009010057 A1 | 1/2009 |
| WO | 2009049625 A1 | 4/2009 |
| WO | 2008040353 A1 | 7/2009 |
| WO | 2009089835 A1 | 7/2009 |
| WO | 2009138086 A1 | 11/2009 |
| WO | 2010025726 A1 | 3/2010 |

(56) References Cited

FOREIGN PATENT DOCUMENTS

| | | |
|---|---|---|
| WO | 2009000271 A1 | 4/2010 |
| WO | 2010045946 A1 | 4/2010 |
| WO | 2013084063 A1 | 6/2013 |
| WO | 2014121796 A1 | 8/2014 |
| WO | 2013084063 A1 | 10/2014 |
| WO | 2014121796 A1 | 12/2015 |
| WO | 2017005843 A2 | 1/2017 |
| WO | 2018109036 A1 | 6/2018 |
| WO | 2019115555 A1 | 6/2019 |
| WO | 2020164865 A1 | 8/2020 |
| WO | 2020187468 A | 9/2020 |
| WO | 2021037966 A1 | 3/2021 |
| WO | 2021037970 A1 | 3/2021 |

OTHER PUBLICATIONS

International Search Report for PCT/EP2020/052011 dated Feb. 25, 2020.

\* cited by examiner

COMPRESSOR UNIT WITH A DAMPED AXIAL CHECK VALVE FOR A DISCHARGE OUTLET

CROSS-REFERENCE TO RELATED APPLICATION

This application is a National Stage application of International Patent Application No. PCT/EP2020/051795, filed on Jan. 24, 2020, which claims priority to European Application No. 19164084.6 filed on Mar. 20, 2019, each of which is hereby incorporated by reference in its entirety.

TECHNICAL FIELD

The invention relates to a compressor unit for a refrigeration system using a refrigerant. The compressor unit comprises a centrifugal compressor for compressing the refrigerant, wherein the compressor has a discharge outlet for discharging the compressed refrigerant. The compressor unit further comprises a check valve, wherein an inlet of the check valve is in fluid connection with the discharge outlet of the compressor.

BACKGROUND

The centrifugal compressor usually further comprises a refrigerant inlet, a rotatable impeller, which is fixed to a compressor shaft, a compressor diffusor, and a motor for rotating the compressor shaft with the impeller. Refrigerant from a low-pressure side of the refrigeration system is sucked into the compressor through the refrigerant inlet. Then, the refrigerant is compressed by the compressor and discharged out of the discharge outlet to a high-pressure side of the refrigeration system.

In more detail, the refrigerant flows from the inlet to the rotating impeller. By its rotation, the impeller accelerates the refrigerant. A flow velocity (unit: m/s) of the refrigerant is increased and a kinetic energy of the refrigerant considerably increases. The refrigerant exiting the impeller can move with a flow velocity that is almost as high as the respective speed of sound. The diffusor converts at least a part of the kinetic energy of the accelerated refrigerant into additional static pressure of the refrigerant. Hence, an outlet pressure of the refrigerant at the discharge outlet is much higher than an inlet pressure of the refrigerant at the refrigerant inlet.

The check valve protects the compressor from damages. In particular, if there is an electric power failure while the compressor is running, the compressor suddenly stops. Consequently, without the check valve, a sudden backward flow of the refrigerant through the compressor would occur: The refrigerant flows back from the high-pressure side to the low-pressure side through the compressor. The backward flow is against a desired forward flow direction. The compressor can be severely damaged by such a backward flow. For example, the compressor may suffer from a deleterious backward rotation of the impeller and the compressor shaft.

The check valve is provided to prevent the backward flow. If the flow velocity of the refrigerant in the forward direction after the discharge outlet decreases below a certain amount or even turns, the check valve quickly closes. Hence, it is avoided that too much refrigerant can flow back into the compressor from the high-pressure side.

In general, different types of check valves are employed, for example swing type check valves, tilting disc check valves, or dual plate check valves. Usually, check valves are selected based on current industry practice and lowest cost.

Swing type check valves are most frequently used. They are inexpensive and do not require external control. Furthermore, they allow comparatively unobstructed flow in the forward direction if they are fully open. However, swing type check valves tend to have rather long closing times. Therefore, backward flow of the refrigerant into the compressor may not be completely prevented. At least by several backflow occurrences, a lifespan of the compressor can decrease. Furthermore, swing type check valves may be prone to cause surge.

If the check valve closes against a strong backward flow of the refrigerant, pressure pulses can occur at the high-pressure side downstream of the check valve. This phenomenon is called surge (also referred to as check valve surge in the following). This can happen if the compressor suddenly stops: The forward flow of the refrigerant decreases, the flow direction reverses. If a substantial backward flow has established before the check valve is completely closed, this backward flow is suddenly blocked by the check valve when the latter finally closes completely. However, the refrigerant downstream of the check valve still has kinetic energy and impulse due to its backward flow velocity. This kinetic energy or impulse is then converted into additional pressure. As a result, sudden excess pressure arises at the downstream side of the check valve. Pressure waves (or shock waves) propagate through the refrigeration system downstream of the check valve. This causes loud "hammer" sounds. The hammer sounds result from a rapid stretching of a pipe downstream of the check valve through which the pressure waves propagate. It should be noted that the typical hammer sounds are not caused by the closing of the check valve as such, in particular not by slamming of any valve component onto a valve seat at rapid closure. Check valve surge can result in considerable damage of components of the refrigeration system.

The risk of check valve surge can be reduced by preloading the check valve such that it closes even if the flow rate has not reversed but falls below a determined minimum flow rate. However, in the latter case, the refrigerant system cannot be operated with low flow rate. Moreover, even if the flow rate exceeds the minimum flow rate, the efficiency may be reduced because the check valve is not fully open due to the preloading. This reduces efficiency for low flow rates. Further, the check valve unit should open even if there is only a small pressure drop along a forward flow direction. Hence, the check valve unit does not impede the forward flow of the refrigerant.

The check valve unit should close as fast as possible, if a reverse pressure drop and reverse flow of the refrigerant occurs. Typically, short times for opening and closing the check valve unit are desired. For ensuring short opening and closing times, a damping with regard to displacement of its valve shaft has to be small. Hence, less force is needed to quickly open or close the check valve unit.

A further type of surge can occur in the centrifugal compressor (referred to as compressor surge in the following). Compressor surge especially occurs if a flow rate of the refrigerant through the compressor falls below a minimum flow rate. Below the minimum flow rate, operation of the compressor becomes unstable.

During compressor surge, the outlet pressure of the compressor strongly fluctuates. In so-called deep compressor surge, the flow rate in the compressor may even reverse (negative flow rate). In addition, the rotational speed of the compressor shaft can vary and a current of the motor for driving the compressor can heavily fluctuate. Strong vibrations and loud noise can occur. For example, the compressor can generate audible thumping (like muffled banging sounds) during compressor surge.

Compressor surge can be deleterious for the compressor itself and other parts of the refrigeration system. For example, strong compressor surge can damage or even destroy the compressor. In particular, failure of blades of the impeller can occur due to fatigue by repeated compressor surge. If strong compressor surge occurs, even instant mechanical blade failure is possible. Compressor surge can also damage bearings for the compressor shaft.

Usually, centrifugal compressors are configured to withstand occasional mild surge. Nevertheless, even such occasional mild surge may generate undesired, worrying noises and vibrations. Furthermore, the lifespan of the compressor and other components of the refrigeration systems may be reduced because fatigue is intensified by surge.

Basically, the check valve can protect the compressor from strong deep surge because it blocks ongoing backward flow of the refrigerant from the high-pressure side when it is closed.

It was noted above, that the risk of damages due to check valve surge in the case of power failure is reduced or even ruled out if the check valve has a short closing time. Therefore, usually, it is desired to make the damping and the closing time of the check valve as small as possible.

The closing time can be reduced by several ways. For example, a mass of the moving parts of the check valve can be decreased. Moving parts may denote all the parts, which have to be moved for closing the check valve for effect sealing for the check function. However, during compressor surge, the compressor is not able to produce a constant flow rate at the compressor outlet during surge. Compressor surge often occurs in repeated, cycling manner (surge cycles). The pressure at the discharge outlet varies according to the surge cycles.

If the mass of the moving parts is very low, the check valves becomes more prone to valve flutter. Valve flutter causes undesired noise and undesired flow losses. It also causes additional wear and fatigue of the check valve. For example, a sealing surface of the check valve for effecting the check function will suffer from valve flutter. Furthermore, resilient elements (if any) for urging the check valve in its closed state may suffer from valve flutter. Especially, valve flutter can occur during compressor surge due to the ongoing pressure fluctuations. Strong valve flutter of the check valve can even result in corresponding repeated check valve surges because backward flow and check valve slamming occurs in accordance with the surge cycles.

It has also been found that valve flutter of the check valve may even amplify the surge cycles related to compressor surge under certain conditions. In particular, valve flutter may increase a magnitude and/or a frequency of the surge cycles. Surprisingly, the negative effects of compressor surge can be even worse with the check valve under these conditions, especially with regard to fatigue related to ongoing surge cycles. Even if the compressor is designed to withstand occasional mild surge, it may be damaged due to fatigue caused by the unintentional interaction of compressor surge and valve flutter.

SUMMARY

The object underlying the invention is to provide a more reliable and more quite compressor unit.

This object is solved by a compressor unit according to claim 1.

The compressor unit comprises a centrifugal compressor for compressing the refrigerant, wherein the compressor has a discharge outlet for discharging the compressed refrigerant; and a check valve, wherein an inlet of the check valve is in fluid connection with the discharge outlet of the compressor.

According to the invention, the check valve is a nozzle check valve including a damping mechanism, wherein a closing parameter of the check valve is between 50 $s/m^2$ and 2000 $s/m^2$, wherein the closing parameter is a closing time of the check valve divided by a port area of the check valve.

The nozzle check valve provides a check function to protect the compressor from undesired backward flow of the refrigerant. The check valve closes if a forward flow rate of the refrigerant in the check valve falls below a predetermined stop flow rate. The predetermined stop flow rate may be zero, for example.

Nozzle check valves offer a short closing time. If the check valve closes very fast, no substantial backward flow of the refrigerant can establish before the check valve is completely closed. Therefore, the risk of check valve surge is reduced or ruled out. At least, a severity of surge (if any) is reduced by using the nozzle check valve. Hence, the proposed compressor unit is more reliable. Furthermore, components of the compressor unit downstream of the check valve can no longer be damaged by strong surge shock waves. The compressor unit with the nozzle check valve is far less prone to generate undesired noise due to check valve surge.

Further, nozzle check valves have a low-pressure drop. In other words, nozzle check valves affect the flow of the refrigerant in the forward direction only very little. This improves the efficiency of the compressor unit.

Nozzle check valves are low inertia check valves. Only low inertia are necessary to change a state of the check valve. Low inertia check valves respond fast to changes of the flow rate of the refrigerant.

However, contrary to the common desire to reduce the closing time further, the present disclosure suggests to employ the nozzle check valve with the additional damping mechanism such that closing parameter is between 50 $s/m^2$ and 2000 $s/m^2$. Naturally, the additional damping mechanism will increase the closing time compared to a similar check valve without the additional damping mechanism. At the other hand, the nozzle check valve is far less prone to valve flutter. The damping mechanism reduces or even completely suppresses valve flutter of the check valve, even in the case of compressor surge and/or in the case of low flow rates. Noises related to valve flutter are suppressed or completely prevented. The damping also decreases the risk of ongoing fast surge cycles that impair recovering a constant flow.

In particular, the damping mechanism suppresses repeated slam close of the check valve in the case of surge. Especially, ongoing, repeated check valve surge is prevented. This enhances the lifespan of the components downstream of the check valve.

It is described above that a very short closing time of the check valve gives rise to valve flutter of the check valve. This may apply, for example, if the closing time is less than 0.05 s. The indicated range of the closing parameter ensures, at the one hand, sufficient suppression of check valve surge and strong compressor surge as well as, on the other hand, sufficient suppression of valve flutter. By using the combination of the nozzle check valve, which has a very short basic closing time (without damping) and the additional, specifically adapted and adjusted damping mechanism, the proposed closing parameter are reliably ensured.

Undesired fast oscillations of the moving parts are damped. An opening degree of the nozzle check valve remains more stable, even if the flow rate is small and if the nozzle check valve is not fully open. Compared to conventional compressor units, the check valve operates more stable at lower flow rates. Thus, an operation range of the compressor unit is enlarged at low flow rates of the refrigerant.

Therefore, surprisingly, providing the additional damping mechanism is advantageous although the closing time is increased by adding the damping mechanism.

The additional damping mechanism further prevents that the frequency of the surge cycles is increased due to fast valve flutter. As the frequency of the surge cycles (if any remain) is lower, the number of corresponding load cycles and associated fatigue loading is reduced by the damping mechanism. Hence, the lifetime of the check valve and the compressor are enhanced.

Summed up, the present invention enhances the reliability, the efficiency, and the operational range of the compressor unit and reduces unpleasant noises.

In a preferred embodiment of the invention, the damping mechanism comprises a fluid damper for damping movements of moving parts of the check valve. For example, the damping mechanism may consist of the fluid damper. This is a cost-efficient and reliable way of implementing the damping mechanism. As the fluid discharged by the compressor may be at least substantially gaseous, this fluid damper may constitute a gas damper.

Preferably, an internal volume of a fluid connection from the discharge outlet of the compressor to the inlet of the check valve is in the range from 0,002 m$^3$ to 0,020 m$^3$.

Even if the check valve has closed completely in the case of compressor surge, a residual amount of refrigerant having high pressure is still located in the internal volume. At least a part of that residual amount can flow back into the compressor although the check valve is closed. The residual amount is reduced by decreasing the internal volume. Accordingly, when the check valve is closed, the pressure of the residual refrigerant in the internal volume decreases rapidly even if only a very small part of the residual amount flows backward. In more general, the smaller the internal volume, the less energy, which could damage the compressor, is "stored" in the residual volume by the residual amount. If the internal volume is small enough, there is no more risk of damage to the compressor by the residual amount.

The small internal volume is particularly advantageous in combination with the additional damping mechanism for the check valve. As noted above, the damping mechanism tends to increase the closing time. Accordingly, an amount of refrigerant that could flow back through the check valve in case of compressor surge or sudden stop of the compressor (for example due to power failure) before the check valve is completely closed tends also to be larger compared with a check valve without the damping mechanism. Said amount is also referred to as "check delay amount" in the present disclosure.

However, the total amount of refrigerant that can flow back in the compressor and hence the corresponding energy do not only depend on the check delay amount but also on the internal volume (as described above). Hence, with the small internal volume, a stronger damping of the check valve, a corresponding longer closing time of the check valve, and finally a larger check delay amount are tolerable without risking damages of the compressor. The stronger damping reduces the risk of valve flutter further.

Furthermore, the small internal volume allows a fast pressure recovery in the internal volume when surge occurs. Hence, the negative effects of surge are reduced.

According to a preferred embodiment of the present invention, the closing parameter of the check valve is between 100 s/m$^2$ and 1000 s/m$^2$. In this range, valve flutter and check valve surge are even less likely.

Preferably, the fluid connection from the discharge outlet of the compressor to the inlet of the check valve comprises an elbow. More preferably, the fluid connection may be formed by the elbow. According to another aspect, the elbow may be formed integrally with at least a part of the housing of the check valve. This reduces the size and the costs of the compressor unit. Furthermore, the transition-free connection between the elbow and the check valve ensures smooth flow of the refrigerant as well as high integrity and reliability of the connection. The elbow may be directly fixed to the compressor.

Preferably, the compressor comprises at least two stages. In other words, the compressor comprises the first stage including a first impeller and at least a second stage including a second impeller. The maximum pressure ratios that can be obtained with a single stage centrifugal compressor are limited. By adding at least the second stage, higher pressure ratios are obtained. Hence, if the inlet pressure is kept constant, a higher outlet pressure can be supplied. Thereby, a power capability of the compressor unit (and hence of the refrigeration system) is enhanced. Both the first impeller and the second impeller may be fixed to the same compressor shaft.

Additionally or alternatively, the compressor is a centrifugal turbo compressor. Turbo compressors offer high efficiency and operate with low noise. The compressor may comprise at least a first stage including a rotatable, first impeller for accelerating the refrigerant.

In general, in centrifugal compressors, the impeller can be fixed to middle portion of the compressor shaft between two bearings. Centrifugal turbo compressors are overhung machines. In other words, the impellers are located at a free end portion of the compressor shaft that extends away from the bearings. Especially, the first impeller of the first stage can be located at the free end. Hence, an upstream side of the first impeller can be formed without restrictions. Furthermore, the refrigerant can approach the first impeller centrally along an axial direction of the compressor shaft because the latter does not extend beyond the first impeller in the axial direction. Additionally, centrifugal turbo compressors allow combining a high power capability with a small size.

Preferably, the compressor comprises a permanent magnet motor for driving the impeller. On the one hand, the permanent magnet motor reduces a size and a weight of the compressor. On the other hand, the permanent magnet motor ensures high efficiency.

Additionally or alternatively, the compressor is a lubricant-free compressor including a magnetic bearing system for a compressor shaft, wherein the magnetic bearing system includes at least one magnetic axial bearing and at least one magnetic radial bearing. When the compressor is energized, the magnetic bearing system prevents mechanical contact of the compressor shaft and the impeller (or impellers) with the bearings or any other parts of the compressor. A compressor shaft assembly comprising the compressor shaft and the impeller (or the impellers) is levitated and held in place magnetically. Hence, the bearings are not prone to mechanical wear. Lubricant-free magnetic bearings provide quiet, reliable operation. This increases the lifespan and the efficiency. No lubricant is needed, in particular no oil. This reduces maintenance, eliminates long-term performance degradation and minimizes the risk of catastrophic failure compared to traditional, oiled designs. Furthermore, the magnetic bearing system reduces noise. For example, an active magnetic bearing system for providing radial and axial load support for a shaft is described in U.S. Pat. No. 5,514,924 A.

More preferably, the bearing system includes a sensor system for monitoring a position of the compressor shaft at least 1000 times per second, wherein the at least one magnetic axial bearing and the at least one magnetic radial bearing are digitally controlled based at least on an output of the sensor system, and wherein the bearing system is configured for active clearance adjustment for the bearings for the compressor shaft.

The active clearance adjustment allows that the bearings adapt to changing operation conditions of the compressor, in particular to changing flow rates and/or changing rotational speed of the motor shaft. The compressor shaft may rotate with different rotational speeds depending on the required output. The rotational speed can be up to 32000 rpm, for example. The active clearance adjustment also allows compensating for sudden changes in load and/or flowing rate.

In more detail, the sensor system may comprise at least one sensor ring, wherein the sensor ring surrounds the compressor shaft. More preferably, the sensor system comprises at least two sensor rings. Each sensor ring may be adapted to monitor an axial position, an axial speed, a rotational position, and/or a rotational speed of the compressor shaft. Most preferably, a first sensor ring is located adjacent to a first radial magnetic bearing and a second sensor ring is located adjacent to a second radial magnetic bearing. The bearing system may comprise a controller that is configured for controlling the active clearance adjustment. The sensor rings may be connected to the controller of the bearing system, respectively.

Most preferably, a response time of the active clearing adjustment is less than the closing parameter of the check valve. For the purpose of the comparison of these values, the closing parameter is indicated in the unit $s/m^2$ (seconds per square meter) and the response time is indicated in the unit s (seconds). The values can be compared although they relate to different physical quantities.

The fast response time of the active clearing adjustment allows compensating even for rapidly changing loads on the compressor shaft assembly in the case of mild surge. Even in the case of surge, the compressor shaft assembly does not collide with any other parts of the compressor. Present active clearing adjustment embodiments allow response times of less than 1 μs, for example in the order of nanoseconds. Therefore, according to the present invention, it is not necessary that the check valve closes as soon as possible. The active clearing can compensate at least for beginning mild surge disturbances. However, deep surge and/or substantial backflow of refrigerant have to be prevented by timely closing the check valve. For example, the response time may be less than 0.1 ms, more preferably less than 50 μs.

As already noted above, it is assumed that the damping mechanism of the check valve prevents that the frequency of the surge cycles is increase due to fast valve flutter. Due to the lower frequencies of the surge cycles (if any remain), the active clearing adjustment is better able to compensate for any disturbances related to the surge cycles. This additionally lowers the risk that the compressor is damaged.

In particular, it is extremely advantageous to combine the feature that the response time of the active clearing adjustment is less than the closing parameter of the check valve with the feature that the closing parameter of the check valve is between 50 $s/m^2$ and 2000 $s/m^2$ or even between 100 $s/m^2$ and 1000 $s/m^2$. At the one hand, the check valve closes fast enough to prevent strong deep surge and substantial backflow of the refrigerant. In particular, the check valve closes fast enough in the case of beginning compressor surge or power failure to avoid disturbances that cannot be compensated for by the active clearing adjustment due to their severity and/or their nature. On the other hand, the damping of check valve is large enough for reliably preventing valve flutter and ensuring stable operation of the compressor unit even in the case of low flow rates. This further increases the allowed operational range of the compressor unit.

Preferably, the fluid connection from the discharge outlet of the compressor to the inlet of the check valve comprises a diffusor portion. This diffusor portion further converts kinetic energy of the refrigerant, which is discharged from the discharge outlet, into increased static pressure. Thereby, a flow velocity of the refrigerant is reduced. By decreasing the flow velocity of the refrigerant between the discharge outlet and the inlet of the check valve, energy losses due to high flow velocity in the check valve (and thereafter) are avoided. The diffusor portion improves the efficiency of the compressor unit. Most preferably, the elbow comprises at least a part of the diffusor portion. For example, the elbow may comprise the complete diffusor portion.

For example, a flow cross-section (unit: $m^2$) may increase by 10% to 250% from an inlet of the diffusor portion to an outlet of the diffusor portion in total, more preferably by 25% to 100%, most preferably by 45% to 75%. The outlet of the diffusor portion may correspond to the inlet of the check valve.

Most preferably, an upstream-side end of the diffusor portion is in direct fluid connection with the discharge outlet of the compressor. In this case, smooth flow of the refrigerant from the compressor to the diffusor portion is ensured. Furthermore, as the diffusor portion begins directly after the discharge outlet, decrease of the flow velocity is immediately started for maximum efficiency.

Additionally or alternatively, a downstream-side end of the diffusor portion extends until a downstream side end of the fluid connection from the discharge outlet of the compressor to the inlet of the check valve. This ensures smooth flow of the refrigerant from the fluid connection into the check valve. Furthermore, a length of said fluid connection can be used optimally in order to decrease the flow velocity of the refrigerant to a large extent for maximum efficiency.

Preferably, the compressor unit comprises a viewing window that allows viewing from the outside into an interior of the fluid connection from the discharge outlet of the compressor to the inlet of the check valve. For example, this allows detecting liquid carry-over from an economizer port. Such a liquid carry-over can damage internals of the compressor. Therefore, the viewing window improves the operational reliability and the maintainability of the compressor unit. Especially, the viewing window may be located in the diffusor portion. According to another aspect, the viewing window may be located in the elbow.

More preferably, the viewing window is configured to allow viewing from the outside onto a valve head of the check valve. Hence, an operator can check whether the valve head is in a correct position and/or whether the valve head is damaged.

Preferably, the check valve comprises:

A shaft bearing body comprising an at least substantially cylindrical mounting portion extending along an axial direction;

a valve shaft mounted in the mounting portion, wherein the valve shaft extends along the axial direction and is displaceable along the axial direction;

a valve head comprising a sealing surface, wherein the valve head is disposed on a distal end of the valve shaft in the axial direction, the distal end facing away from the mounting portion.

More preferably, the check valve further comprises a damping reservoir inside the shaft bearing body, wherein a volume of the damping reservoir is changed by movement of the valve shaft with regard to the shaft bearing body along the axial direction;

Most preferably, in the check valve, at least two channels are provided in parallel, each of the channels constituting a fluid connection between the damping reservoir and an outside of the shaft bearing body, wherein the damping reservoir is, apart from the channels, at least substantially enclosed, wherein each channel has a length being at least ten times a hydraulic diameter of the respective channel.

In particular, the outside of the shaft bearing body may be a main flow channel for a fluid (for example, the refrigerant) passing the check valve if the check valve is open.

The damping reservoir and the channels constitute a fluid damper in terms of the present disclosure.

In the following, the term "the fluid" may be used instead of the term "the refrigerant" sometimes.

In general, the term "channels are provided in parallel" (or "parallel channels") does not require that the at least two channels are geometrically parallel. The term shall solely indicate that the at least two channels establish at least two different fluid connections through which a fluid can pass in parallel in order to flow from the damping reservoir to the outside of the shaft bearing body and vice versa. In other words, a first and a second channel are not parallel in this meaning if the same part of the fluid first has to flow through the first channel and then further through the second channel when flowing from the damping reservoir to the outside of the shaft bearing body (or vice versa). In this case, the first channel and the second channel are arranged "in series" ("consecutive channels"). Furthermore, it has to be understood that it is not required that the fluid connections between the damping reservoir and the outside of the shaft bearing body are established solely by the parallel channels alone. For example, an additional conduit or several additional conduits may be provided in series to one or more of the parallel channels in order to complete the fluid connection between the damping reservoir and the outside of the shaft bearing body.

The length of the channels is large compared to their hydraulic diameters. The channels hence comprise a large inner surface facing the fluid inside the channel. The importance of boundary effects for fluid flowing through the channels is high. Therefore, a laminar flow of within the channels is facilitated. The effect is considerably increased by providing at least two channels because the individual channels can be smaller in comparison to the case, in which all of the fluid has to pass through one single channel. Hence, the flow of fluid between the damping reservoir and the outside of the shaft bearing body is precisely determined by the channels. On the other hand, with at least two channels in parallel, the individual channels can be shorter and therefore the size of the check valve is kept small.

The at least two parallel channels are configured as a "bottleneck" for fluid flowing between the damping reservoir and the outside of the shaft bearing body. Hence, the damping is at least substantially determined by the at least two channels. In other words, the check valve is configured that a flow resistance for the fluid flowing between the damping reservoir and the outside of the shaft bearing body is at least substantially determined by the at least two parallel channels.

The check valve according to the present invention exhibits well-defined and optimal damping characteristics regarding axial displacement of the valve shaft. Therefore, well-defined opening and closing times can be assured. Furthermore, undesired oscillations are avoided. For example, valve fluttering is prevented even if the check valve is only partially open.

In addition, the check valve according to the present invention exhibits quick and well-defined closing at surge in the centrifugal compressor.

The hydraulic diameter $d_H$ of an individual one of the channels may be calculated from an cross-sectional area $A_c$ of the channel in a plane perpendicular to a longitudinal direction of the channel and an inner circumference $O_c$ of said channel as follows: $d_H = 4*A_c/O_c$.

In general, the hydraulic diameter of the individual channel may vary along the longitudinal direction of the channel. The term "hydraulic diameter" preferably refers to a minimum hydraulic diameter or to an effective hydraulic diameter. The effective hydraulic parameter is the hydraulic parameter of a uniform cylindrical channel having the same length as the actual channel of the embodiment and exhibiting substantially the same flow resistance as the actual channel, wherein the latter may be of a more complex shape.

Highly preferably, each channel has a length being at least 25 times the hydraulic diameter of the respective channel, more preferably at least 50 times. In these cases, the channels are long enough for obtaining even stronger influence of the inner surface of the channels facing the fluid flowing therein.

However, the length of each channel is highly preferably equal or less than 2000 times its hydraulic diameter, more preferably less than 1000 times. Otherwise, the flow resistance would be too high and could impair fast closing of the check valve.

The check valve may be configured to allow the fluid to flow along a forward flow direction but to prevent the fluid from flowing in a backward flow direction opposite to the forward flow direction.

The sealing surface of the check valve may be configured for sealingly abutting to a corresponding valve seat of the check valve. For example, the sealing surface can have at least substantially the shape of an annular line. According to another example, the sealing surface might be of an at least frusto-conical shape. As a further example, the shape of the sealing surface can at least substantially correspond to a spherical zone.

The valve shaft with the valve head and the sealing surface of the check valve (i.e. a valve shaft assembly) are configured to be displaced from a closing position along the axial direction. A maximum stroke of the valve shaft (and the valve head with its sealing surface) in the axial direction is the range between the closing position and a fully opened position. The displacement of the valve shaft can cause opening and closing of the check valve.

According to another aspect, the maximum stroke of the valve shaft is preferably within a range from 4 mm to 100 mm, more preferably from 5 mm to 50 mm, and most preferably from 6 mm to 35 mm. Such a maximum stroke is small enough for short opening and closing times of the check valve but exhibits a sufficient large opening for not impeding substantially the desired fluid flow through the check valve along the forward flow direction.

In particular, the closing position may be an axial position of the valve shaft in which the valve head protrudes furthest from the shaft bearing body.

The valve head is at least axially fixed with respect to the valve shaft. Preferably, the valve head is axially and rotationally fixed to the valve shaft. For example, the valve head can be formed integrally with the valve shaft.

Preferably, a total mass of the valve shaft assembly comprising the valve shaft and the valve head is less than 300 g. Therefore, the valve shaft assembly can be accelerated very quickly. This promotes short opening and closing times.

Additionally or alternatively, a mass parameter of the check valve is between 10 kg/m$^2$ and 60 kg/m$^2$, wherein the mass parameter is a mass of a valve shaft assembly of the check valve divided by the port area of the check valve. More preferably, the mass parameter of the check valve is between 20 kg/m$^2$ and 60 kg/m$^2$. As a force of the refrigerant on the valve head for closing the check valve in the case of starting backward flow depends on a cross-section of the valve head (and hence to the port area of the check valve), the optimum mass of the v varies for different port areas.

A proximal side of the valve shaft with a proximal end thereof is inserted into an interior of the shaft bearing body. The valve shaft is mounted by the mounting portion of the shaft bearing body. In particular, the mounting portion holds and guides the valve shaft in an axial displaceable manner.

The damping reservoir can partially extend into a cavity of the valve shaft located at the distal end of the valve shaft, wherein the cavity is open at the distal end of the valve shaft.

In a highly preferred embodiment of the invention, the proximal end of the valve shaft constitutes a distal end of the damping reservoir. This embodiment requires few parts and is easy and cheap to manufacture.

In a highly preferred embodiment of the present invention, the valve head includes a sealing element, wherein the sealing surface of the check valve is located on the sealing element. The sealing element is at least axially fixed to the valve head, more preferably axially and rotationally fixed to the valve head. The sealing element can be made of PFFE, for example.

More preferably, the check valve further comprises a resilient element forcing the valve shaft in the axial direction towards the closing position. In other words, the resilient element exhibits a restoring force for closing the check valve. Consequently, the valve head and the sealing surface are forced in the closing position together with the valve shaft. The valve shaft can be displaced by an external force counteracting the resilient force. For example, an opening force for displacing the valve shaft in the axial direction towards the fully opened position may arise from a difference between an upstream-side pressure acting on a distal side of the valve head and a downstream-side pressure acting on a proximal side of the valve head. In this case, the opening force results from the upstream-side pressure being higher than the downstream-side pressure and/or by an effective area of the distal side, on which the upstream-side pressure acts. Said effective area may be larger than an effective area of the proximal side of the valve head, on which the downstream-side pressure acts. The upstream-side and downstream-side are defined with respect to the aforementioned forward flow direction.

According to an aspect of the invention, the check valve 1 has a central unit comprising at least the valve head and the shaft bearing body, wherein the central unit is configured such that it has a drop-like outer shape when the check valve is fully open. Therefore, the flow resistance for fluid flowing through the check valve around the central unit is very low. This increases the energy efficiency of circuits in which the check valve is used.

Additionally or alternatively, an inner shape of the housing of the check valve and outer shapes of the valve head and of the central body, around which the fluid flows when the check valve is open, are configured such that a local minimum static pressure occurs at a downstream side of the valve head when the latter is in the fully opened position.

According to a more preferred embodiment of the present invention, the inlet of the check valve has an inner diameter (port diameter) in the range from 32 mm to 120 mm, most preferably in the range from 90 mm to 100 mm. With such a dimension, the check valve is adapted for use in typical refrigeration systems, for example for chillers.

According to still another aspect, a minimum flow cross-section within the check valve is preferably larger than 70% of a port area of the check valve. More preferably, the minimum flow cross-section is between 80% and 95% of the port area. This reduces the flow resistance, the pressure drop, and hence increases the efficiency. The port area is a flow cross-section at the inlet of the check valve. The minimum flow cross-section within the check valve may be formed between the sealing holder and the housing of the check valve, for example.

Additionally or alternatively, the check valve may be configured to act as a further diffusor portion (at least) when it is in its fully open position. The further diffusor portion of the check valve may continue the diffusor portion of the fluid connection from the discharge outlet of the compressor to the inlet of the check valve, most preferably directly and uniformly. This further reduces the space required for installing the compressor unit and further improves the efficiency of the compressor unit and/or the whole refrigeration unit. In particular, the flow cross-section at the outlet of the check valve may be larger than the port area. For example, the flow cross-section at the outlet of the check valve is equal or larger than 110% of the port area, even more preferably equal or larger than 120% of the port area. However, the flow cross-section at the outlet may be less than 150% of the port area. The flow velocity has already been slowed down before by the diffusor portion before the check valve and a larger flow cross-section at the outlet would increase the size, the weight, and the costs of the check valve.

Especially, the flow cross-section may gradually enlarge within the check valve along the forward flow direction from a location of the minimum flow cross-section to the outlet of the check valve.

Most preferably, the resilient element is a spring, for example a compression spring. The spring may be mounted between the valve shaft and the shaft bearing body. In particular, a part of the shaft bearing body constituting the proximal side of the damping reservoir may comprise a spring seat. The spring seat is adapted to mount a proximal end of the spring. The spring seat may be of an at least substantially annular shape. Most preferably, the spring extends partially through the cavity of the valve shaft.

A spring constant of the resilient element may be less than 0.1 N/mm, more preferred less than 0.02 N/mm. The spring constant should be as low as possible such that only a small pressure drop along the forward flow direction is necessary to keep the check valve in the fully opened position.

If the resilient element is provided, for example the spring, the closing time is measured as the time necessary for the moving parts to travel from the fully open state to the fully closed state vertical up against gravity using the energy from the resilient element (for example the spring) in atmospheric air pressure. If no resilient element provided, the closing time may be measured as the time necessary for the moving parts to travel from the fully open state to the fully closed state vertical down (i.e. parallel to gravity) due to gravity in atmospheric air pressure. Such tests can be easily performed by any skilled person at any workbench in open air.

Such test can be easily performed by any skilled person at any workbench in open air.

As noted above, the volume of the damping reservoir changes according to the axial position of the valve shaft. The check valve is configured so that fluid flows into or out of the damping reservoir through the channels if the valve shaft is axially displaced in order to dampen said axial movement.

In particular, the more the valve shaft is displaced in the axial direction away from its closing position, the more reduced is the volume of the damping reservoir. Hence, fluid in the damping reservoir flows into the channels from the damping reservoir, further through the channels, and finally to the outside. The viscosity of the fluid causes a damping force counteracting axial movement of the valve shaft.

Vice versa, the more the valve shaft is displaced in the axial direction towards its closing position, the more increased is the volume of the damping reservoir. Hence, fluid enters from the outside into the channels, further flows through the channels, and finally enters into the damping reservoir. Again, the viscosity of the fluid causes the damping force counteracting axial movement of the valve shaft.

The damping force is mainly determined by the fluid flowing through the channels. As the dimensions of the channels are large compared to the manufacturing tolerances, there is only a low sensitivity of the damping characteristics to the manufacturing tolerances. Therefore, with the present invention, well-defined damping characteristics are ensured.

The desired damping characteristic can be finely adjusted by the number of the channels, the lengths of the channels and the shapes of the channels, for example.

In a further highly preferred embodiment of the invention, the damping reservoir is located in the shaft bearing body. For example, the damping reservoir may be constituted of the cavity formed in the shaft bearing body and a proximal portion of an interior of the shaft bearing body. The damping reservoir may be delimited at its distal end by the proximal side of the valve shaft. At its proximal end, the damping reservoir may be delimited by a wall of the shaft bearing body.

The hydraulic diameter of each channel is highly preferably at least 0.07 mm, even more preferably at least 0.1 mm. Additionally or alternatively, the hydraulic diameter of each channel is highly preferably equal to or less than 1 mm at the maximum, even more preferred less than 0.5 mm, for example less than 0.3 mm.

In general, it is not necessary that the channels be of a straight-line shape. For example, they might be provided as helical grooves (see below). However, in a preferred embodiment of the invention, the channels are of straight-line shape.

Highly preferably, at least three channels, even more preferably at least four channels, and still even more preferably at least five channels are provided. Hence, the fluid flow is divided into more channels. There is a sufficient number of channels that the individual channels are small enough to ensure laminar flow of the fluid therein even if a large flow of fluid occurs during fast movement of the valve shaft assembly.

With a given total area of cross-section of all channels perpendicular to the respective fluid flow direction inside the channels (referred to as total channel cross-section), the damping characteristics are the better the channels are provided. This is explained in the following: Supposed all channels are of the same or at least of a similar shape, providing more channels without increasing the total channel cross-section means that the channel cross section (perpendicular to the respective fluid flow direction therein) of each single channel is reduced. In other words, the single channels are getting smaller. If the channels are small enough, a laminar flow within the channels is ensured. Providing more channels facilitates to make the single channels small enough such that the damping force is proportional to the absolute value of the velocity of the valve shaft instead of being proportional to said velocity in the power of two.

On the other hand, the number of channels should not be excessively high in order to allow a cost-efficient, fast, and reliable production of the check valve. Thus, the number of the channels is preferably 200 at the maximum, more preferably 100 at the maximum, and most preferably 50 at the maximum. Furthermore, if the single channels are too small, they may be prone to clogging even by very small dirt and/or abrasion particles.

Of course, it is highly advantageous if the number of channels is within the upper and lower limits mentioned above.

According to a highly preferred aspect, fluid flowing between the damping reservoir and the outside has to pass a total length of the channels independently from the axial position of the valve shaft. Consequently, the damping characteristics are independent from the axial position of the valve shaft.

Some of the channels or all of the channels may be provided in a channel portion. In other words, said channels are grouped together in one single channel portion. The channel portion may be provided in one single unit. This considerably facilitate the production of the check valve and reduce its costs. Furthermore, the size of the check valve is decreased by grouping the channels together.

In a preferred embodiment of the invention, the check valve comprises a circumferential groove portion, which is disposed on an outer circumferential surface of the valve shaft or on an inner circumferential surface of the mounting portion and extends along the axial direction, wherein the channels are formed by parallel helical grooves provided in the groove portion.

In this case, each of the helical grooves constitutes one channel and hence the fluid connection between the outside of the shaft bearing body and the damping reservoir. Furthermore, in this case, the channel portion is formed by the groove portion. As the grooves constitute the channels in this embodiment, naturally, any features described with regard to the channels may apply to the grooves. In more detail, the channels are confined by the surfaces of the respective helical groove and a surface of a counterpart. If the groove portion is disposed on the inner circumferential surface of the mounting portion, the surface of the counterpart is the outer circumferential surface of the valve shaft. Vice versa, if the groove portion is disposed on the outer circumferential surface of the valve shaft, the surface of the counterpart is the inner circumferential surface of the mounting portion.

Parallel helical grooves have the same helical pitch. Therefore, different helical grooves do not cross each other. Thus, a more uniform flow of fluid in each helical groove is ensured. At least two helical grooves are provided in order to obtain flow force symmetry for better concentricity and less wear.

In an even more preferred embodiment of the present invention, all helical grooves are equally spaced apart in the circumferential direction. This also helps to avoid imbalances and undesired moments and a risk of jamming of the valve shaft is reduced.

According to highly preferred embodiment of the present invention, the check valve includes an insert, wherein the channels are formed by the insert. In particular, the channel may comprise the channel portion. For example, the insert may be of an at least substantially cylindrical shape.

The insert may be press-fit to the check valve, in particular to a receiving portion of the check valve. Hence, the insert as such is produced separately. This considerably facilitates the production of the channels. Alternatively, the insert may be fixed to the check valve by means of threads.

The insert may be fixed directly to and within the shaft bearing body (for example by press-fit as noted above). Hence, the shaft bearing body comprises the receiving portion in this case. Even more preferably, the insert is arranged at a proximal end of the damping reservoir. For each channel, a proximal end of the channel may be in fluid connection with the outside of the shaft bearing body and a distal end of the channel may be in fluid connection with the damping reservoir. For example, the distal openings of the channels open directly into the damping reservoir. A conduit may be provided in the shaft bearing body in series with the channels for establishing the fluid connection between the outside and the proximal openings of the channels. The conduit may extend in the axial direction. Alternatively, the proximal ends of the channels may open directly to the outside of the shaft bearing body.

Highly preferably, the channels are formed by grooves on a radially outer surface of the insert (i.e. an outer surface of the insert seen in the radial direction). In this case, each channel is confined by surfaces of the respective groove and a surface of the receiving portion facing the groove.

In particular, the channels may be formed by straight grooves, which are parallel to the axial direction. An insert comprising such straight grooves can be produced reliably, fast, and cost-efficient. The straight grooves may be equally distributed on the radially outer surface of the insert.

Alternatively, channels are formed by helical grooves on the radially outer surface of the insert. Said helical grooves on the radially outer surface may be formed like the helical grooves in the groove section described above. The advantages of helical grooves are evident from above. However, it is more difficult and more expensive to manufacture helical grooves than straight grooves. Most preferably, all channels are formed by helical grooves on the radially outer surface.

In general, depending on the individual requirements for different check valves, identical check valves but different inserts can be produced. Hence, the check valve exhibiting specific damping characteristics can be manufactured by producing the specific insert configured to exhibit said desired damping characteristics when being properly fixed to the check valve and then fixing this insert to the check valve. In particular, the damping characteristics of the check valve are determined by the number and/or the shape of the channels of the insert.

Where an insert is used, a difference between an outer circumferential diameter of the insert and an inner circumferential diameter of the receiving portion before mounting the insert may be about 0,5%, but at least less than 0,7%. If channels are formed on the radially outer surface of the insert, said diameter difference may be less than 40% of the depth of the channels.

More preferably, the check valve further comprises a valve seat, wherein the sealing surface of the valve head sealingly abuts the valve seat when the valve shaft is in the closing position and wherein the sealing surface is displaced away from the valve seat when the valve shaft is displaced in the axial direction away from the closing position. In other words, the check valve is closed when the valve shaft is in its closing position and the check valve is open when the valve shaft is not in its closing position. The fluid is prevented from flowing through the check valve when the valve shaft is in its closing position. However, the fluid can flow through the check valve (in particular pass between the sealing surface of the check valve and the valve seat) if the valve shaft is not in the closing position.

A shape of the valve seat may be adapted to the shape of the sealing surface of the check valve (and/or vice versa). Examples for the shape of the sealing surface are mentioned above.

Most preferably, the check valve comprises a housing including the valve seat, wherein the shaft bearing body is fixed to the housing. Highly preferably, the valve seat and the shaft bearing body are formed integrally with the housing. Hence, the ruggedness and compactness of the check valve are improved. In particular, the housing can be manufactured by 3D printing. For example, the housing and/or the shaft bearing body can be metal printed. The metal may comprise or consist of titanium, aluminum, and steel.

According to another aspect of the present invention, the check valve most preferably exhibits stable partial opening at least down to 15% of the rated mass flow of the check valve, most preferably down to 10%. Check valves without the well-defined damping characteristics according to the present invention are prone to oscillations if they are only partially open.

Most preferably, the check valve is a straight flow valve. Therefore, the flow of the fluid during operation does not need to be deflected and the flow resistance of the open check valve is decreased. Apart from that, the straight flow valve configuration needs less space and is easier to include in fluid circuits, for example a refrigerant circuit.

According to another preferred embodiment of the present invention, the compressor unit comprises an additional stop mechanism to close a fluid connection from the discharge outlet of the compressor to an outlet of the check valve in addition to a check function of the check valve. This allow closing the fluid connection steadily and independently from the check function. If the fluid connection is blocked by the stop mechanism, the discharge outlet is no longer in fluid connection with the high-pressure side of the refrigeration system. In this state, the stop mechanism steadily, safely, and reliably separates the compressor from the high pressure-side of the refrigeration system. Backflow of the refrigerant from the high-pressure side is prevented. Hence, the compressor can be detached from the fluid connection. For example, the compressor may be detached from the elbow. This facilitates maintenance of the compressor and replacing the compressor. Furthermore, the stop mechanism allows protecting the compressor from the high-pressure side of refrigeration system if the check function is not available or if the check function is suspected being defect.

According to still another preferred modification, the valve shaft assembly is mounted such that a displacement of the valve shaft assembly in at least one direction perpendicular to a central axis of the check valve is allowed. The allowed displacement may be limited. Alternatively or additionally, the valve shaft assembly is mounted such that a tilting of the valve shaft assembly with respect to the central axis of the check valve is allowed. The allowed tilting may be limited. Thus, the position of the valve head is able to adapt to the position of the valve seat. In other words, a misalignment between the valve head and the valve seat can be compensated for. This improves tight and reliable sealing. For example, at least a part of the shaft bearing body may be mounted elastically in the radial direction.

More preferably, the compressor unit comprises different sealing surfaces for the check function and the stop mechanism. In other words, the additional stop mechanism and the check function use different sealing surfaces. The stop mechanism does not use the sealing surface of the check valve mentioned above. The compressor unit may comprise a first sealing mechanism for the check function and a second sealing mechanism for the stop mechanism, wherein the second sealing mechanism is different from the first sealing mechanism.

In some existing check valves, the check function can be manually locked in the closed state such that the check valve is permanently closed. However, in this case, the sealing surfaces and the sealing mechanism of the check function are used for permanently closing the check valve. Unfortunately, the sealing surfaces for the check function are prone to wear and fatigue as the check function may be activated repeatedly during normal operation of the compressor unit. Hence, there is a risk that the check function cannot prevent that at least small amounts of the refrigerant leak out through the check valve from the high-pressure side of the refrigeration system even if the check function is manually locked in the closed state. This is not a problem with regard to dynamic closing of the check function during normal operation because no refrigerant can leak out to the environment. Furthermore, very small amounts of refrigerant passing backwards through the check valve from the high-pressure side of the refrigeration system in the case of dynamic closing of the check function during normal operation may not be a vital problem. However, if the compressor is demounted from the fluid connection, for example for repair or replacement, the refrigerant could leak out to the outside, pollute the environment, or even harm a repair crew. As the compressor unit comprises different (separate) sealing surfaces for the stop mechanism, the reliable tight sealing of the stop mechanism cannot be impaired by repeated activation and wear of the check function during normal operation of the compressor unit.

Apart from that, vice versa, there is no need for an additional means for manually locking the check function in the closed state. Hence, the check function as such can be less complex and more reliable. Further, there is less friction for the moving parts and less weight of the moving parts related to the check function as such. This improves the functionality of the check function in normal operation.

Summed up, in this embodiment, the reliability, maintainability and safety of the compressor unit are improved.

According to an even more preferred embodiment of the invention, the compressor unit comprises an additional valve in the fluid connection from the discharge outlet of the compressor to the inlet of the check valve. The additional valve is provided in addition to the check valve. Therefore, the additional valve is completely separate and independent from the check valve. In this case, the additional valve features the stop mechanism.

Most preferably, the additional valve is a ball valve. Ball valves are inexpensive, compact, and reliable. Further, they induce only a low pressure drop if they are fully open. Consequently, the efficiency of the compressor unit is not impaired by the ball valve.

According to another aspect, most preferably, the additional valve is provided at an upstream-side end of the fluid connection from the discharge outlet of the compressor to the inlet of the check valve. Accordingly, an internal volume between the additional valve and the discharge outlet is minimized. This minimizes an amount of refrigerant that could leak out from this internal volume although the additional valve is closed when the compressor becomes demounted.

Additionally or alternatively, the additional valve is located at an upstream side end of the diffuser portion. There, the flow cross-section of the fluid connection is smallest. The additional valve is particularly small and inexpensive in this case. The additional valve may also form a part of the diffusor portion when it is completely open. In other words, the additional valve is integrated in the diffusor portion. For example, an inner passage of the ball of a ball valve may comprise at least substantially a shape of a frustum of a cone. This reduces the size of the compressor unit, in particular of the fluid connection from the discharge outlet of the compressor to the inlet of the check valve.

According to another, even more preferred embodiment of the invention, the compressor unit comprises a combined valve unit, wherein the combined valve unit comprises both the check valve and the additional stop mechanism. For example, at least one component of the check valve may be formed integrally with at least one component of the additional stop mechanism. However, it should be noted that also in this case, different sealing surfaces for the check function and the additional stop mechanism are used.

In particular, the sealing surface for the check function is not used for the stop mechanism. Further, the combined valve unit may comprise the check valve as the first sealing mechanism for the check function the second sealing mechanism for the stop mechanism, wherein the second sealing mechanism is different from the first sealing mechanism.

With the combined valve unit, a size of the compressor unit is particularly small. A high degree of integration is obtained.

Most preferably, the combined valve unit is a ball valve with an integrated check valve. In more detail, the combined valve unit is the ball valve, wherein the check valve is formed in a ball of the ball valve. The complete check valve including its housing is inside an outer housing of the combined valve unit. The housing of the check valve serves as the ball at the same time. The sealing surface of the check valve is provided inside the ball. Sealing for the ball takes place between an outer surface of the housing of the check valve and the outer housing of the combined check valve unit. In particular, at least one sealing comprising a sealing surface for the additional stop mechanism (i.e. the ball valve) is provided between the housing of the combined valve unit and the outer surface of the housing of the check valve. Said sealing surface abuts and seals against the outer surface of the housing of the check valve, at least if the ball valve is closed.

For opening the ball valve, the ball (i.e. the complete check valve including its housing) is turned inside the combined valve unit such that the inlet of the check valve faces an inlet of the combined valve unit and that the outlet of the check valve faces an outlet of the combined valve unit. In other words, the complete check valve is turned such that its axial direction is parallel to a flow direction through the combined valve unit.

For closing the ball valve, the ball (i.e. the complete check valve including its housing) is turned inside the combined valve unit such that the housing of the check valve closes the inlet and/or the outlet of the combined valve unit. In particular, the housing of the check valve may block both the inlet and the outlet of the combined valve unit when the ball valve is closed. Preferably, the complete check valve can be turned such that its axial direction is at least substantially perpendicular to the flow direction through the combined valve unit for closing the ball valve.

The problem mentioned above is further solved by a discharge unit for a discharge outlet of a compressor. Hence, the present invention also relates to the discharge unit as such. The compressor can be of any of the embodiments and modifications described above. The discharge unit comprises the combined check valve, wherein at least a part of the outer housing of the combined valve unit is formed integrally with a conduit for the fluid connection from the discharge outlet to the inlet of the check valve unit. In other words, the conduit and at least said part of the outer housing of the combined valve unit are formed in one piece. This reduces the complexity and allows a cost-efficient production. Furthermore, fewer transitions between different components are necessary and hence the risk of leakages is reduced. Furthermore, the internal volume between the discharge outlet of the compressor and the inlet of the combined valve unit (and, in particular, the inlet of the check valve) are particularly small. This decreases the risk that the compressor is damaged in the case of compressor surge.

An upstream-side end of the discharge unit may be configured to be fixed to the compressor such that an inlet of the discharge unit (especially, an inlet of the conduit) is in direct fluid connection with the discharge outlet of the compressor. More preferably, the discharge unit is configured to be detachably fixed to the compressor. This allows disconnecting the compressor for maintenance, repair, or replacement. In more detail, a mounting flange may be integrally formed at the upstream side end of the discharge unit. The mounting flange may comprise at least three through holes for fixing the discharge unit to the compressor, for example by means of threaded bolts.

The discharge unit also may comprise the elbow. Additionally or alternatively, the discharge unit may comprise the diffusor portion. In particular, the elbow and the diffusor portion may coincide. Highly preferably, the combined check valve is formed at a downstream-side end of the diffusor portion. The elbow and/or the diffusor portion may extend from the inlet of the discharge unit to the combined valve unit.

A housing of the discharge unit constituting at least said part of the outer housing of the combined valve unit and the conduit for the fluid connection from the discharge outlet to the inlet of the check valve unit may be made of an aluminum alloy, for example AlSi7Mg (T6). It may be investment casted.

The embodiments and modifications relating to the elements of the compressor unit as well as the corresponding advantages may accordingly apply to the discharge unit as such, for example with regard to:

the fluid connection from the discharge outlet of the compressor to the inlet of the check valve accordingly from the inlet of the discharge unit to the inlet of the check valve, the elbow, the diffusor portion(s), the combined check valve, and/or the check valve as such, According to a preferred embodiment of the invention, the compressor unit comprises the discharge unit according to any one of the possible embodiments and modifications.

According to a preferred embodiment of the invention, the compressor unit comprises the discharge unit according to any one of the possible embodiments and modifications.

According to another preferred aspect, the compressor unit is configured for the refrigeration system using a low-pressure refrigerant. In other words, the compressor is adapted for compressing low-pressure refrigerants. In terms of the present disclosure, low-pressure refrigerants may be refrigerants that are suitable for discharge pressures up to 25 bar. Accordingly, the compressor may be adapted for providing a maximum discharge pressure of 25 bar or less.

The object mentioned above is further solved with a refrigeration system according to claim 15.

The refrigerant system comprises the compressor unit according to any one or any combination of the embodiments and modifications described above. The advantages apply accordingly to the refrigerant system.

Preferably, the refrigerant system comprises a refrigerant. For example, the refrigerant may consist of or comprise R-134a. More preferably, the refrigerant is a low-pressure refrigerant, for example R-1234ze or R-513A.

According to a preferred embodiment of the present invention, the refrigeration system comprises a chiller.

Preferably, the refrigeration system is an air-conditioning system.

Additional features, advantages and possible applications of the invention result from the following description of exemplary embodiments and the drawings. All the features described and/or illustrated graphically here form the subject matter of the invention, either alone or in any desired combination, regardless of how they are combined in the claims or in their references back to preceding claims.

BRIEF DESCRIPTION OF THE DRAWINGS

Preferred embodiments of the invention will now be described with reference to the drawings, in which.

DETAILED DESCRIPTION

Figure 1:
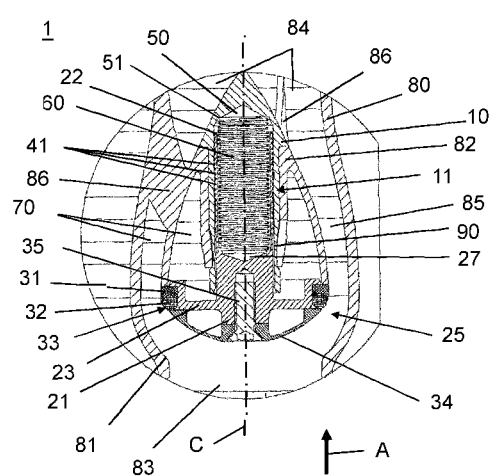
FIG. 1 shows a cross-sectional view of a first embodiment of a check valve of a compressor unit according to the present invention with a housing comprising a valve seat in an open state, wherein channels are formed by helical grooves in a groove portion which is located at an outer circumferential surface of a valve shaft.

FIG. 1 shows a cross-sectional view of a first embodiment of a check valve 1, which can be used in a compressor unit according to the present invention, with a housing 80 comprising a valve seat 81 and a body holder 82. Both the valve seat 81 and the body holder 82 are integrally formed with the housing 80. In more detail, the body holder 82 is connected to an outer wall of the housing 80 by three support arms 86. Due to the view, only two of the support arms 86 are visible in FIG. 1.

The housing 80 with the body holder 82 is produced by metal printing. For example, it can be made of titanium, titanium alloy, aluminum, aluminum alloy, and/or steel. In particular, it can be made of AISI 316.

In an interior of the housing 80, a shaft bearing body 10 is fixed to the body holder 82. A substantially rod-shaped interior is provided in the shaft bearing body 10. The shaft bearing body 10 extends along a central axis C and is rotationally symmetric to said central axis C. The central axis C is parallel to an axial direction A. An opening of the interior to an outside 70 (i.e. the outside of the shaft bearing body 10) is located in the axial direction A at a distal end of the shaft bearing body 10 and faces towards the valve seat 81.

A proximal side of a valve shaft 20 is inserted into the interior of the shaft bearing body 10. In this embodiment, an inner circumferential surface of the shaft bearing body 10 delimiting the interior in a radial direction perpendicular to the axial direction A acts as a mounting portion 11 for holding the valve shaft 20 in the shaft bearing body 10. In particular, the mounting portion 11 holds and guides the valve shaft 20 such that it is displaceable in the axial direction A between a closing position and a fully opened position of the valve shaft 20, said fully opened position being depicted in FIG. 1.

In the proximal side of the valve shaft 20, which is inserted into the shaft bearing body 10, a substantially rod-shaped cavity 27 is formed in the valve shaft 20. The cavity 27 opens at a proximal end 22 of the valve shaft 20. The cavity 27 and a proximal end portion of the interior of the shaft bearing body 10 are hence in fluid connection and form a damping reservoir 50. A compression spring 60 is mounted between a distal end of the cavity 27 in the axial direction A and a spring seat 51. The spring seat 51 is disposed at a proximal end of the interior of the shaft bearing body 10. The spring 60 forces the valve shaft 20 in the axial direction A towards the valve seat 81. For example, a spring constant of the spring 60 may be 0.01 N/mm.

A valve head 25 is disposed at a distal end 21 of the valve shaft 20. In this embodiment, the valve head 25 consists of a distal flange 23 of the valve 20 formed integrally with the latter and extending in the radial direction, a head cap 34, a sealing holder 31, a sealing element 32, and a screw 35. The sealing element 32 is a sealing ring exhibiting a sealing surface 33 for sealingly abutting the valve seat 81 when the valve shaft 20 is in the closing position. In particular, the sealing surface 33 of the embodiment of FIG. 1 has the shape of an annular line.

The head cap 34 is fixed to the distal end 21 of the valve shaft 20 by means of the screw 35. The screw 35 is threaded into a corresponding threaded hole. Said threaded hole is disposed in the middle of the distal end 21 and proximally extends along the central axis C. The head cap 34 is configured for guiding fluid from a fluid inlet 83 of the check valve 1 to the flow passage 85 when the check valve 1 is open.

The sealing element 32 is fixed between the head cap 34 and the sealing holder 31. The sealing holder 31 is fixed to an outer radial end of the distal flange 23 of the valve shaft 20. By this, a valve shaft assembly comprising the valve shaft 20, the sealing holder 31, the sealing element 32, head cap 34, and the screw 35 can be assembled in an easy, quick, and cost-efficient manner. The valve shaft assembly includes the moving parts of the check valve 1.

In this specific embodiment, the valve shaft assembly is made of aluminum and Polytetrafluoroethylene (PFFE) and has a total mass of 0.01 kg. Hence, if the check valve is installed in a vertical orientation as depicted in FIG. 1, a gravitational force of approximately 0.1 N supports the resilient force of the spring 60 in closing the check valve 1.

If it is not certain in which spatial orientation the check valve 1 will be installed and/or used, a restoring force of the spring 60 must be sufficient to keep the valve shaft assembly reliably in the closing position independent of said spatial orientation when there is no pressure drop in a forward flow direction. In particular, if the check valve 1 is installed upside down compared to the orientation shown in FIG. 1, the spring 60 has to overcome the gravitational force of 0.1 N of the valve shaft assembly. In order to keep the check valve 1 reliably closed when there is no pressure drop in the forward flow direction, the resilient force of the spring 60 may, for example, correspond to 130% of the gravitational force (i.e. 0.13 N in the given example) when the check valve 1 is in closed. If the valve shaft assembly is moved away from its closing position, the resilient force of the spring 60 increases according to its spring constant. When the valve shaft assembly is in its fully opened position, the resilient force of the spring 60 may be, for example, about 0.2 N.

Figure 2:
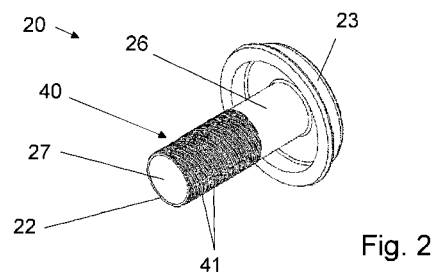
FIG. 2 shows a perspective view a valve shaft of the check valve of FIG. 1, wherein ten helical grooves are provided in the groove portion.

FIG. 2 shows the valve shaft 20 of the check valve 1 of FIG. 1 in a perspective view. At the proximal end 22 of the valve shaft 20, the cavity 27 can be seen. At the proximal side of the valve shaft 20, a groove portion 40 is provided at an outer circumferential surface of the valve shaft 20. Within the groove portion 40, ten helical grooves 41 are provided at the outer circumferential surface. Each of the helical grooves 41 exhibits two helical turns. In other words, each helical groove 41 winds two times around the valve shaft 20. Seen in the axial direction A, each helical groove 41 comprises an inner end opening at the proximal end 22 of the valve shaft 20 and an outer end opening facing towards the distal flange 23 of the valve shaft 20. Hence, the outer end opening constitutes a distal end of the respective helical groove 41.

The valve shaft 20 comprises a middle part 26 between the groove portion 40 and the distal flange 23. In the middle part 26, the diameter of the outer circumferential surface of the valve shaft 20 is smaller than in the groove portion 40 by an amount corresponding to a depth of the helical grooves 41. Hence, there is no edge or step for fluid flowing into or out of the outer end openings of the helical grooves 41.

As mentioned above, the proximal side of the valve shaft 20 with the groove portion 40 is inserted into the shaft bearing body 10 (see FIG. 1). Due to the reduced radial thickness of the valve shaft 20 in its middle part 26, a gap 90 is formed between the inner circumferential surface of the shaft bearing body 10 and the outer circumferential surface of the valve shaft 20 in the middle part 26. The gap 26 constitutes a fluid connection between the outside 70 of the shaft bearing body 10 and the distal ends of the helical grooves 41, namely their outer end openings. The cross-sectional area of the gap 90 perpendicular to the axial direction A is considerably larger than a total area of cross-section of all helical groves 41 perpendicular to the axial direction A. Therefore, there is no influence or at least no significant influence of the gap 90 on the damping characteristics of the check valve 1.

As the diameter of the outer circumferential surface of the valve shaft 20 is larger in the groove portion 40 than in the middle part 26, the groove portion 40 corresponds to an engagement portion of the valve shaft 20.

Independent of the axial position of the valve shaft 20, even when it is in its closing position, the groove portion 40 always remains completely in the interior of the shaft bearing body 10. In all axial positions of the valve shaft 20, the groove portion 40 (engagement portion) remains engaged with the shaft bearing body 10 over the whole length of the groove portion 40. In particular, over the complete range of axial motion of the valve shaft 20, the complete groove portion 40 is guided in a sliding area of the inner surface of the shaft bearing body (mounting portion 11), wherein the diameter of the inner circumferential surface of the shaft bearing body 10 is constant within the mounting portion 11.

Accordingly, independent of the axial position of the valve shaft 20, fluid flowing between the damping reservoir 50 and the outside 70 of the shaft bearing body 10 has to pass through the entire length of the helical grooves 41. The helical grooves 41 never protrude out of the interior of the mounting portion 11. Therefore, the damping effect of the helical grooves 41 and the damping characteristics of the check valve 1 are independent from the axial position of the valve shaft 20 and hence of the axial position of the valve head 25.

In other words, each helical groove 41 constitutes a single channel for the fluid and constitutes a fluid connection between the damping reservoir 50 and the outside 70.

As the inner circumferential surface of the shaft bearing body 10 in the mounting portion 11 slidably mounts the groove portion 40 (which therefore also constitutes the engagement portion of the valve shaft 20), said inner circumferential surface may be denoted as counterpart surface of the groove portion 40 and the helical grooves 41. Each single channel is formed by the respective helical groove 41, wherein the channel is confined by side surfaces of the helical groove 41 and is covered by the counterpart surface facing said helical groove 41.

The helical grooves 41 are arranged in parallel such that the fluid passes all helical grooves 41 in parallel at the same moment when flowing between the damping reservoir 50 and the outside 70. In other words, the fluid flow between the damping reservoir 50 and the outside 70 is split up into all parallel helical grooves 41.

In FIG. 1, the axial direction A is parallel to a direction of gravity. Hence, gravity forces the moving parts of the check valve 1 towards the valve seat 81. The gravitational force of the valve shaft assembly helps to close the check valve 1.

It has to be noted that the shaft bearing body 10, the valve shaft 20, and the valve head 25 are at least substantially rotationally symmetric. This facilitates the manufacture of the check valve 1.

If the check valve 1 is an open state, for example in the fully open state depicted in FIG. 1, fluid can enter the check valve 1 through the fluid inlet 83 of the housing 80, pass between the valve seat 81 and sealing surface 33 and further through a flow passage 85 constituted between an outer wall of the housing 80 and an outer wall of the body holder 81 to a fluid outlet 84 of the housing 80. Said flow passage 85 extends round about the body holder 82. Seen in a circumferential direction perpendicular to the axial direction A, the flow passage 85 is only interrupted by the three support arms 86.

The desired forward flow direction for the fluid from the fluid inlet 83 to the fluid outlet 84 is substantially parallel to the axial direction A.

The check valve 1 depicted in FIG. 1 is a straight flow valve. It is compact and exhibits low flow resistance for fluid flowing through it in the forward flow direction.

It is evident from FIG. 1 that the proximal side of the valve head 25, in particular a proximal side of the sealing holder 31, fittingly abuts on a distal end of the outer wall of the body holder 82 in the fully opened position (i.e. when the check valve 1 is fully open). No gap, edge, or step but a smooth transition is obtained between the valve head 25 and the outer wall of the body holder 82, said outer wall constituting an inner wall of the flow passage 85.

The valve head 25, the body holder 82 (disregarding the support arms 86), and the outer wall of the shaft bearing body 10 together form an at least substantially drop-shaped unit when the check valve 1 is fully open. Therefore, the flow resistance for fluid flowing through the check valve 1 from the fluid inlet 83 to the fluid outlet 84 is very small. This is beneficial for energy-efficient fluid circuits.

If a force of the fluid in the axial direction A to (keep) open the check valve 1, in particular caused by an upstream-side pressure, is lower than the sum of the resilient force of the spring 60 and the gravitational force of the valve shaft assembly, the valve shaft assembly moves against the axial direction A towards its closing position or remains in the closing position.

If the check valve 1 is in the closed state and if the upstream-side pressure is high enough that its resulting force acting on the head cap 34 exceeds the resilient force of the spring 60, the gravitational force of the valve shaft assembly, and a force due to a downstream-side pressure in the flow passage 85 (if any), then the valve shaft assembly is moved in the axial direction A away from its closing position. Hence, the sealing surface 33 is lift off from the valve seat 81 and fluid can pass between the sealing element 32 and the valve seat 81. In this way, the check valve 1 opens.

Due to its configuration with several (namely ten) helical grooves 41, the check valve 1 exhibits well-defined damping characteristics for movement of the valve shaft assembly.

If the valve shaft 20 moves in the axial direction A, a volume of the damping reservoir 50 is changed. To compensate for the volume change, fluid has to flow into the damping reservoir 50 from the outside 70 or, vice versa, to flow from the damping reservoir 50 to the outside 70. Fluid flowing between the damping reservoir 50 and the outside 70 of the shaft bearing body 10 is pressed through the helical grooves 41. As the fluid has a predetermined viscosity, this requires a certain force. In this way, a damping force counteracting movement of the valve shaft 20 in the axial direction A is exhibited.

In the groove portion 40, the ten helical grooves 41 occupy 50% of the outer circumferential surface of the valve shaft 20. Accordingly, the single grooves 41 are very small.

In the embodiment shown in FIGS. 1 and 2, for example, the depth of the helical grooves may be 0.2 mm. This means, that each helical grooves extends 0.2 mm in the radial direction towards the center line C starting from the outer circumferential surface of the valve shaft 20 in the groove portion 20. The valve shaft 20 is slidably mounted by the areas of the groove portion 40 between adjacent helical grooves 41. These ungrooved areas in the groove portion 40 hence constitute the sliding surface for mounting the valve shaft 20 within the mounting portion 11.

For example, in the embodiment shown in FIG. 1, a width of the single helical grooves 41 in the circumferential direction may be 0.5 mm.

As the respective helical grooves 41 are small, boundary effects are of considerably importance if fluid is pressed through the helical grooves 41 due to movement of the valve shaft 20 in the axial direction A. In particular, the Reynolds number for fluid flow between the valve shaft 20 and the shaft bearing body 10 is less than 2300. Accordingly, the damping force is proportional to the absolute value of a velocity of the movement of the valve shaft 20 in the axial direction A. This damping characteristic can only be obtained by providing several but small helical grooves 41 and by the helical grooves 41 occupying at least a considerable amount of the outer circumferential surface in the groove portion 40.

In particular, the damping force is not proportional to the velocity of the movement of the valve shaft 20 in the power of two as in other, known check valves.

Therefore, fast movements of the valve shaft assembly are not exceedingly damped. With the well-defined damping characteristics, the low mass of the valve shaft assembly, the spring 60, and the gravitational force of the valve shaft assembly, the check valve 1 closes in less than 0.2 s if fluid is going to flow in a backward flow direction against the desired forward flow direction.

For example, in order to close the check valve 1, the valve shaft assembly might accelerate to a maximum velocity in 0,002 s. Then it is damped to at least nearly maintain the maximum velocity of 0.1 m/s. This results in a closing time of about 0.1 s.

On the other hand, as the damping force is proportional to the absolute value of the velocity of the valve shaft 20, sufficient damping force is exhibited even in cases of slow movements. In particular, the check valve 1 is not prone to oscillations if it is only partially open. Furthermore, the check valve 1 is not prone to instable opening or closing.

For example, the check valve 1 can be used in cooling and/or refrigeration systems, respectively. Additionally or alternatively, it can be used for centrifugal compressors, in particular for protecting centrifugal compressors in the case of surge.

In particular, the check valve 1 is configured for use in a refrigerant circuit, wherein R134a, R410a or CO2 are used as a refrigerant. In typical operating conditions, the viscosity of R134a and R410a at the check valve 1 is in the range from 10 µPa·s to 20 µPa·s. The number, shape, and the dimensions of the helical grooves 41 as well as the damping reservoir 50 of the check valve 1 are adapted to this viscosity range in order to obtain the desired damping characteristics, respectively.

In the check valve 1 according to FIGS. 1 and 2, a port diameter of the check valve 1 at the inlet 83 is 30.5 mm. A port area of the check valve 1 (i.e. a cross-sectional area of the inlet 83 of the check valve 1) is 7.3 cm$^2$. A closing parameter of the check valve is 137 s/m$^2$. The closing parameter is the port area divided by the closing time (0.1 s in this case, see above).

With the above-mentioned size and characteristics, the check valve 1 is particularly suitable for refrigeration systems with high-pressure refrigerants. However, the above design can be adapted for low refrigerants as well. In this case, the port area has to be increased, because more volume in total has to be supplied for obtaining the same refrigeration capability due to the smaller total pressure difference in the refrigeration system. Accordingly, the check valve 1 gets larger in size. In particular, the mass of the valve shaft assembly increases. However, the closing parameter should be held in the range from 50 s/m$^2$ to 2000 m/s$^2$, more preferably between 100 s/m$^2$ to 1000 m/s$^2$.

The closing time (and hence the closing parameter) can be adjusted by adjusting the damping of the check valve 1. In more detail, the damping force can be reduced by providing more channels (helical grooves 41) of the same type, by increasing the width and/or the depth of the channels, and/or by reducing the length of the channels. Vice versa, the damping force can be increased by providing less channels of the same type, by decreasing the width and/or the depth of the channels, and/or by increasing the length of the channels. Of course, in general, the damping characteristics may further depend on the type and the state of the refrigerant.

Figure 3:
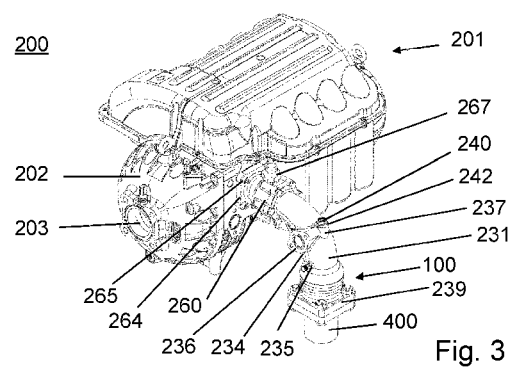
FIG. 3 is a perspective view of an embodiment of a compressor unit according to the present invention.

FIG. 3 is a perspective view of an embodiment of a compressor unit 200 according to the present invention. The compressor unit 200 comprises a centrifugal compressor 201, a check valve 100 according to a second embodiment and a fluid connection 220 from a discharge outlet 204 of the compressor 201 to an inlet 83 of the check valve 100. In more detail, an inlet 221 of the fluid connection 220 is directly connected to the discharge outlet 204.

The check valve 100 of the second embodiment is very similar to the check valve 1 of the first embodiment. Corresponding elements are denoted by the same reference signs and are not described again. The descriptions, modifications and advantages apply accordingly. Parts having the same names but different reference signs may be identical to the corresponding parts of the check valve 1 except the differences, which are described and/or are necessary.

An inlet port 400 of a refrigeration system is directly fixed to the check valve 100. The inlet port 400 of the refrigeration system is in (direct) fluid communication with the outlet 84 of the check valve 100. In more detail, bolts 402 are inserted into through holes of a fixation flange 401, which is formed at an upstream-side end of the inlet port 400, and are threaded into corresponding screw holes in a flange 239, which is formed at a downstream-side end of a housing 101 of the check valve 100. The refrigeration system may be a chiller system, for example.

The fluid connection 220 includes a ball valve 260 and a conduit 231. The conduit 231 constitutes a fluid connection from an outlet of the ball valve 260 to the inlet 83 of the check valve 100. An interior of the conduit 231 includes a diffusor portion 222 of the fluid connection 220.

Figure 6:
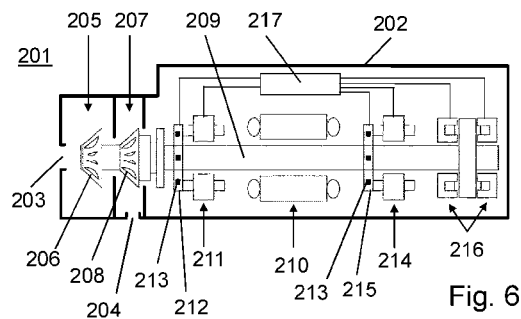
FIG. 6 is a schematic drawing of the compressor of FIG. 2.

FIG. 6 is a schematic view of the structure of the compressor 201. It is adapted to accelerate and compress a refrigerant of the refrigeration system. The compressor 201 comprises a compressor inlet 203 for sucking in the refrigerant and the discharge outlet 204 for discharging the accelerated and compressed refrigerant.

In this embodiment, the compressor 201 comprises a first stage 205 and a second stage 207 for compressing the refrigerant. By this, higher pressure ratios can be achieved compared to a compressor having only one single stage. Hence, the refrigeration system can be operated more effectively. The pressure ratio is an outlet pressure of the compressed refrigerant at the discharge outlet 204 divided by an inlet pressure at the compressor inlet 203.

A first impeller 206 of the first stage 205 and a second impeller 208 of the second stage 207 are rotationally and axially fixed to a compressor shaft 209. The compressor 201 further comprises a permanent magnet motor 210 for rotating the compressor shaft 209 and with the first impeller 206 and the second impeller 208 mounted thereon.

The compressor 201 further comprises a magnetic bearing system for the compressor shaft 209. It includes a first magnetic radial bearing 211, a second magnetic radial bearing 214, and a magnetic axial bearing 216.

The compressor 201 is a turbo centrifugal compressor. It is an overhung machine. Both the first impeller 206 and the second impeller 208 are located at a free end portion of the compressor shaft 209, which points towards the compressor inlet 203 (see FIG. 6). This side is referred to as the inlet side of the compressor 201 in an axial direction of the compressor shaft 209. An opposite side in the axial direction of the compressor shaft 209 is referred to as motor side. The free end portion extends away from the magnetic bearings (the first magnetic radial bearing 211, the second magnetic radial bearing 214 and the magnetic axial bearing 216) of the compressor 201. Accordingly, all magnetic bearings 211, 214, and 216 are located at the same side of the compressor shaft 209, which is opposite to the free end portion in the axial direction. The magnetic bearings 211, 214, and 216 are located on the motor side with respect to the first impeller 206 and the second impeller 208.

Seen in the axial direction of the compressor shaft 209, the first stage 205 is located next to the compressor inlet 203. The second stage 207 is located adjacent to the first stage 205 towards the motor side. At the inlet side, the compressor shaft 209 ends at the first impeller 206. The compressor inlet 203 is located centrally with respect to the first impeller 206 in a radial direction, which is perpendicular to the axial direction of the compressor shaft 209.

The magnetic bearing system holds and guides the compressor shaft 209 without mechanical contact, at least when the compressor 201 is operated. In other words, the compressor shaft 209 is held floating (without mechanical contact) by the magnetic bearing, at least during operation. The compressor shaft 209 is not supported and/or guided by slide bearings during operation of the compressor 209. The compressor 201 is a lubricant-free compressor with regard to the compressor shaft 209. No lubricant is needed for the magnetic bearings 211, 214, and 216, in particular no oil.

If the compressor 201 is not operated, the magnetic bearing system may be shut off and the compressor shaft 209 may rest mechanically on the magnetic bearings 211, 214, and 216.

In this embodiment, the magnetic bearing system further comprises sensor system and a controller 217. The sensor system includes a first sensor ring 212 and a second sensor ring 215. The first magnetic radial bearing 211, the second magnetic redial bearing 214, the magnetic axial bearing 216, the first sensor ring 212, and the second sensor ring 215 are connected to the controller 217, respectively.

The first sensor ring 212 circumferentially surrounds a part of the compressor shaft 209 and comprises a plurality of sensors 213. The sensors 213 are arranged around the compressor shaft 209 in a circumferential direction, which is perpendicular to the axial direction of the compressor shaft 209 and to its radial direction. In particular, the sensors 213 may be evenly distributed around the compressor shaft 209. The first sensor ring 212 is adapted to measure a rotational position, a rotational speed, an axial speed, and/or an axial position of the compressor shaft 209. For example, the measurement may be based on magnetic interaction between the compressor shaft 209 and the sensors 213. The structure, the possible modifications, and the corresponding advantages of the first sensor ring 212 may apply to the second sensor ring 215 accordingly.

The first sensor ring 212 is located adjacent to the first magnetic radial bearing 211, in particular at the inlet side thereof. The second sensor ring 215 is located adjacent to the second magnetic radial bearing 214, in particular at the inlet side thereof.

The first magnetic radial bearing 211 and the second magnetic radial bearing 214 are spaced apart from each other in the axial direction of the compressor shaft 209. Hence, the compressor shaft 209 is easily held during operation such that it does not displaced in the radial direction at the whole and that its axis does not tilt. The axial magnetic bearing 216 prevents the compressor shaft 209 from moving in the axial direction of the compressor shaft 209.

Embodiments of radial magnetic bearings are described in U.S. Pat. No. 9,624,939 B2 in more detail.

Summed up, the magnetic bearing system ensures a correct position of the compressor shaft 209. The correct position includes both a correct spatial orientation of the compressor shaft 209 and a correct location of the compressor shaft 209 with respect to the housing 202 of the compressor 201, at least during operation of the compressor 201. In this context, the spatial orientation preferably does not include a rotational position of the compressor shaft 209. In other words, it might not be necessary that the magnetic bearing system as such can ensure a certain rotational position of the compressor shaft 209. The rotational position might be controlled by the motor 210.

Accordingly, the first sensor ring 212 and the second sensor ring 215 are spaced apart from each other in the axial direction. Hence, both radial movements of the whole compressor shaft 209 and tilting of the central axis of the compressor shaft 209 can be easily and reliably measured by the sensor rings 212 and 215.

The controller 217 controls the first radial magnetic bearing 211, the second radial magnetic bearing 214, and the axial magnetic bearing 216 based at least on an output of the sensor system. If a flow rate of the refrigerant changes and/or if disturbances in the flow of the refrigerant occur, the magnetic bearing system compensates for the changing loads on the compressor shaft 209 and maintains the correct position of the latter.

In addition, the controller 209 may consider other input data for controlling the magnetic bearings 211, 214, and 216. For example, the other input data may include data regarding an intended rotational speed of the compressor shaft 209, data of flow sensors, which measure a flow of the refrigerant inside and/or outside the compressor 201.

In particular, the magnetic bearing system is configured to maintain mechanical clearances between the magnetic bearings 211, 214, and 216 and the compressor shaft 209 in respective predetermined ranges during operation of the compressor 201. By this, the magnetic bearing system prevents that any part of a shaft assembly of the compressor 201 mechanically collides with any other part during operation. The shaft assembly includes the compressor shaft 209, the first impeller 206, and the second impeller 208. This ensures a long lifespan and reliable operation of the compressor unit 200 even if the loads on the compressor 201 vary during operation.

According to an aspect of the present invention, the sensor system preferably monitors the position of the compressor shaft 209 at least 10.000 times per second, for example 100.000 times per second. Therefore, it can be very quickly determined if the position of the compressor shaft 209 deviates from its correct position. Accordingly, a response time of the active clearing system is very short. It is less than 50 µs and hence considerably shorter than the closing time of the check valve 100, which is 0.7 s in this embodiment.

Another embodiment of a turbo centrifugal compressor, which is suitable for a compressor unit according to the present invention, is described in U.S. Pat. No. 7,240,515 B2. This compressor comprises an active magnetic bearing system. In more detail, axial and radial electromagnetic bearings of said compressor are provided to counteract axial and radial loading on a rotor shaft of the compressor. It is referred to U.S. Pat. No. 7,240,515 B2 regarding details of this compressor. The compressor of said document includes a first centrifugal compressor having two stages and a second centrifugal compressor having two stages. Just for example, the first compressor could be used as the compressor in terms of the present invention.

Figure 4:
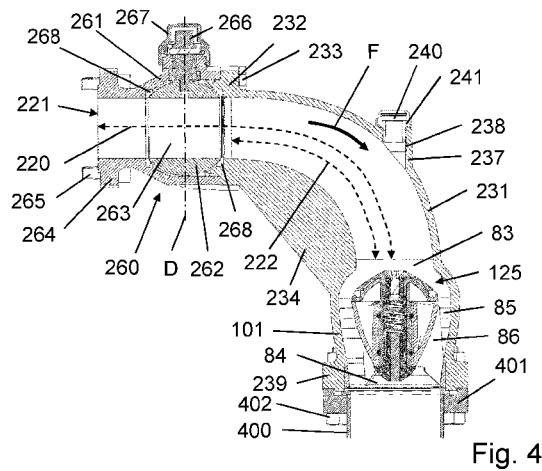
FIG. 4 is a cross-sectional view a of discharge unit of the compressor unit of FIG. 3, wherein the discharge unit comprises a ball valve, an elbow with a diffusor portion and a second embodiment of a check valve.

Along a forward flow direction F, the ball valve 260 directly follows the discharge outlet 204. As can be seen in FIG. 4, the ball valve 260 comprises a housing 261, a ball 262 with an inner passage 263, and a spindle 266 for rotating the ball 262 within the housing 261 from an outside of the housing 261. The spindle 266 is fixed to the ball 262.

On its upstream-side end, the housing 261 of the ball valve 260 comprises a flange 264 for fixing the ball valve 260 to the compressor 201. In this embodiment, the flange 264 includes four through holes. Bolts 265 are inserted therein and are threaded into corresponding screw holes at the discharge outlet 204 of the compressor 201. Thereby, the ball valve 260 is detachably fixed to the compressor 201, in more detail to the housing 202.

A rotational position of the ball 262 can be changed by rotating the spindle 262. In FIG. 4, the ball valve 260 is in a fully open position. An inlet of the inner passage 263 faces the inlet 221 of the fluid connection 220. An outlet of the inner passage 263 is fully open to the diffusor portion 222. A central axis of the ball 262 is parallel to a local central axis of the fluid connection 220 at the ball valve 260. A forward flow of the refrigerant along the forward flow direction F from the inlet 221 into the conduit 231 is not obstructed.

In this example, a diameter of the inlet 221 is 50 mm. Hence, a flow cross-section of the inlet 221 is 20 cm².

The ball 262 can be rotated by 90° inside the housing 261 to a closed position. In this embodiment, a rotational axis D of the ball 262 and the spindle 266 is vertical in FIG. 4. In the closed position, the flow of the refrigerant trough the ball 260 is obstructed by a circumferential wall of the inner passage 263. One side of this wall faces towards the inlet 221 and blocks an inlet of the ball 260. In other words, this side faces the inlet 221 of the fluid connection 220. An opposite side of the wall then closes an outlet of the ball valve 260. Said opposite side faces towards the conduit 231. Tight sealing between the ball 262 and the housing 261 is ensured by two annular sealing rings 268.

The ball valve 260 constitutes an additional stop mechanism in terms of the present invention, which is provided in addition to the check function of the check valve 100. In this embodiment, the additional stop mechanism is completely separated from the check function. The ball valve 260 and the check valve 100 are completely different assemblies.

If the ball valve 260 is closed, for example manually, the ball valve 260 blocks the fluid connection 220. In this state, the ball valve 260 reliably and permanently prevents that refrigerant can leak out from the high-pressure side of the refrigeration system. The fluid connection 220 can be demounted from the compressor 201 and the latter can be maintained, repaired, or replaced without leakage of the refrigerant to the environment. Thus, the ball valve 260 improves the maintainability of the compressor unit 200.

In FIG. 3 and FIG. 4, the spindle 266 is covered by a cap 267 to avoid unintentional change of a position of the ball 262. Alternatively of additionally, a stop ring (not shown) may be detachably fixed to an outer end of the spindle 266 to prevent unintentional rotation of the spindle 266 and hence the ball 262.

In this embodiment, the inner passage 263 is of a cylindrical shape. It has an inner diameter of 50 mm and hence a continuous flow cross-section of 20 cm². In a modification, the inner passage may have at least substantially the shape of a truncated cone (not shown). When this ball valve is in the fully open position, a flow cross-section of the inner passage gradually increases from the inlet of the inner passage to the outlet of the inner passage. Hence, the inner passage also constitutes a diffusor portion. Accordingly, the diffusor portion 222 and hence the conduit 231 can be shorter with this modification.

After the ball valve 260, the fluid connection 220 continues through the conduit 231. A minimum wall thickness of the conduit 231 may be at least 7 millimeters, for example 8 millimeters. In this embodiment, the conduit 231 constitutes an elbow. In this embodiment, the fluid connection 220 bends 90°. In other words, the elbow has an angle of 90°. In other modifications, the elbow may have another angle, for example 60° or 45°. A flat strut 234 is formed on an inner side of the bend of the elbow. The flat strut 234 is formed integrally with the conduit 231. This helps to reduce maximum mechanical stresses that occur in the elbow during operation. In still another modification, the conduit 231 may extend straight. In other words, no elbow is formed.

At its upstream-side end (with regard to the forward flow direction F), the conduit 231 comprises a flange 232 for fixing the conduit 231 detachably to a downstream-side end of the ball valve 260. The flange 232 comprises six through holes for bolts 233. The bolts 233 are inserted into the through holes of the flange 232 and are screwed into corresponding screw holes at the downstream-side end of the housing 261 of the ball valve 260. By this, the conduit 231 is detachably fixed to the ball valve 260. The outlet of the ball valve 260 is in fluid connection with the inlet 83 of the check valve 100 via the interior of the conduit 231, especially via the diffusor portion 222.

In the diffusor portion 222, the flow cross-section of the inner passage 220 gradually increases along the flow forward direction. At the inlet of the conduit 231, the inner diameter of the fluid channel 220 is only slightly larger than in the inner passage 263 of the ball valve 260. In more detail, the inner diameter is approximately 51 mm at the inlet of the conduit 231, which corresponds to a flow cross-section of still approximately 20 cm$^2$. However, it is slightly larger than the flow cross-section of the inner passage 263. An outlet of the conduit 231 is at the same time the inlet 83 of the check valve 100. The inlet 83 has a port diameter W of 64 mm. Hence, the port area of the check valve 100 is 32 cm$^2$. Consequently, the flow cross-section gradually increases in the diffusor portion 222 along the forward flow direction F by 57%. According to another aspect, the flow cross-section increases in the fluid channel 220 from its inlet 221 along the forward flow direction F to the inlet 83 of the check valve 100 by 64%. Hence, sufficient kinetic energy of the refrigerant discharged by the compressor 201 is converted to additional static pressure, whereas the flow velocity of the refrigerant is considerably reduced. Accordingly, the flow velocity within the check valve 100 is decreased. This allows a more uniform flow of the refrigerant within the check valve 100 and decreases energy and pressure losses within the check valve 100.

A viewing window 240 is provided in the conduit 231. In more detail, the viewing window 240 is located at least approximately in the middle of the conduit 231 at an upper side thereof. The viewing window 240 allows looking into the interior of the fluid connection 220 from an outside of the compressor unit 200, in particular into the diffusor portion 222. An operator can see from the outside whether liquid is present in the flow channel 220. This can happen due to liquid carry-over through an economizer port (not shown). If the liquid enters the compressor 201, it can damage the latter. Furthermore, the liquid can impair the flow of the refrigerant and/or damage or impair the functionality of other components, for example the check valve 100 or components of the refrigeration system. If the operator detects liquid in the flow channel 220, he can refrain from starting the compressor 201 and repair the system to avoid such problems and/or dysfunctionalities.

Furthermore, the viewing window 240 allows looking onto the valve head 125 of the check valve 100 from the outside of the compressor unit 200. It can be detected from the outside whether the valve head 125 is damaged. Furthermore, it can be seen from the outside whether the valve shaft assembly of the check valve 100 moves correctly and whether the valve shaft assembly is in a correct position. This facilitates the inspection of the compressor unit 200.

In more detail, the viewing window 240 is enclosed in a carrier body 241. The carrier body 241 with the viewing window 240 is detachably fixed to the conduit 231 and is regarded to be a part of the latter. An inward end of the carrier body 241 comprises an outer thread, which is engaged with an inner thread 238 of a connection nozzle 237. The connection nozzle 237 is a part of the conduit 231 and formed integrally with the latter. The carrier body 241 comprises an external hexagon 242. This facilitates mounting the carrier body 241 to the conduit 231. The viewing window 240 can be easily replaced. Furthermore, due to the connection nozzle 237 with the internal thread, other components can be detachably fixed to the conduit 231 instead, for example a sensor—like a pressure sensor, a sensor for automatically detecting liquid in the flow channel 220, and/or a sensor for measuring the position of the valve head 125.

In addition, a connector 235 is formed at a side of the conduit 231. The connector 235 comprises a through hole from the outside of the compressor unit 201 to the fluid connection 220 and a thread. By the connector 235, a pressure sensor and/or a refrigerant recovery can be connected to the fluid connection 220.

Furthermore, a staging flange 236 is formed at the same side of the conduit 231. The staging flange comprises two M10×1.5 screw holes.

Figure 5:
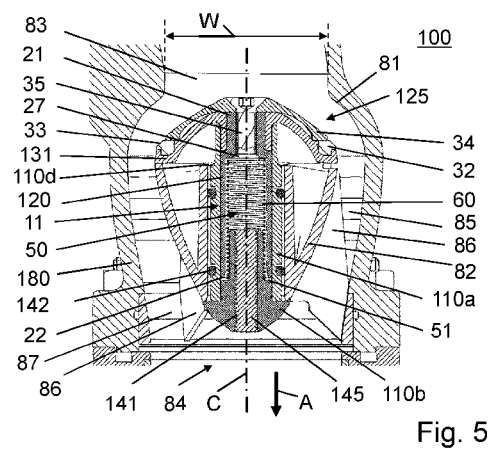
FIG. 5 is a cross-sectional view of the check valve of FIG. 3 and FIG. 4 in a fully open position.

Seen along the forward flow direction F, the check valve 100 directly follows after the diffusor portion 222. FIG. 5 is an enlarged cross-sectional view of the check valve 100 of the compressor unit 200 in FIG. 3.

The housing 280 of the check valve 100 is formed integrally with the conduit 231 and hence with the elbow. The whole one-piece part may be made of metal. The metal may comprise or consist of titanium, aluminum, and steel. In this specific example, the housing 280 and the conduit 231 are made of the aluminum alloy AlSi7Mg (T6).

A valve head 125 of the check valve 100 slightly differs from the valve head 25 of the check valve. In the check valve 100, there is not distal flange of the valve shaft 120. Instead, a sealing holder 131 has a mushroom-like shape. The sealing holder 131 is at least axially fixed to the valve shaft 120, preferably also rotationally. Accordingly, the valve shaft assembly is constituted by the valve shaft 120, the sealing holder 131, the sealing element 32, the head cap 34, and the screw 35 in this embodiment.

In the check valve 120, a shaft bearing body consist of a shaft bearing sleeve 110a, an end cover 110b, and an insert 145.

The shaft bearing sleeve 110a has at least substantially the shape of a cylinder tube. It is mounted in a cylindrical mounting hole of the body holder 82. Said mounting hole is formed in a center of the body holder 82 along the central axis C. The shaft bearing sleeve 110a is at least axially fixed to the body holder 82 and hence to the housing 180, preferably also radially.

As in the check valve 1, a proximal side of the valve shaft 120 is inserted into the shaft bearing body. In more detail, in this embodiment, the proximal side of the valve shaft 120 is inserted into an interior of the shaft bearing sleeve 110a. The mounting portion 11 for the valve shaft 120 is located in an inner circumferential surface of the shaft bearing sleeve 110a. The valve shaft 120 is held by the mounting portion 11, wherein the valve shaft 120 and hence the complete valve shaft assembly are displaceable in the axial direction A of the check valve 100.

As the shaft bearing sleeve 110a is produced separately, the mounting portion 11 is manufactured with very high accuracy in a cost-efficient manner. Low tolerances of the mounting portion 11 are obtained. This ensures proper engagement of the valve shaft 120 and the mounting portion 11, low friction for the axial movement of the valve shaft 120, low wear, and high reliability of the check valve 100.

In this embodiment, the shaft bearing sleeve 110a is made of bronze. This material is well suited for slide bearings. It can be manufactured with high accuracy.

Accordingly, higher manufacturing tolerances are possible for the body holder 82. This reduces the production costs. Furthermore, the body holder 82 can be made of a lighter material. In this case, the body holder 82 is made of the same aluminum alloy as the support arms 86 and the housing 280 of the check valve 100. In particular, the support arms 86 are formed integrally with the body holder 82. A common circumferential mounting ring 87 is fixed to a distal end (downstream-side end) of all support arms 86. In this case, the mounting ring 87 is formed integrally with the support arms 86. The mounting ring 87 is fixed to a distal end of the housing 280 of the check valve 100. In particular, an outer circumferential surface of the mounting ring 87 comprises an external thread engaging an inner thread provided at a downstream-side end of an inner surface of the housing 280.

In this embodiment, the valve shaft 120 is made of stainless steel. Consequently, it has a good chemical resistance and a high mechanical load capacity. This increases the reliability and prolongs the lifespan of the check valve 100.

Two circumferential mounting grooves for O-rings 142 are provided on an outer circumferential surface of the shaft bearing sleeve 110a. The two circumferential mounting grooves are spaced apart from each other in the axial direction A. In more detail, a first circumferential mounting groove is formed near a proximal end of the shaft bearing sleeve 110a, and a second circumferential mounting groove is formed near a distal end of the shaft bearing sleeve 110a.

An O-ring 142 is mounted in each of the mounting grooves, respectively. The O-rings 142 are made of an elastomeric material. The outer circumferential surface of the shaft bearing sleeve 110a abuts an inner circumferential surface of the body holder 82 via the O-rings 142. In other words, the shaft bearing sleeve 110a is supported in the radial direction via the elastomeric O-rings 142.

Accordingly, the valve shaft assembly can be displaced in the radial direction by a limited amount and/or a central axis of the valve shaft assembly can be tilted by a limited amount with respect to the central axis C. At least one of the O-rings 142 is deformed in these cases. Each of the deformed O-rings 142 has an elastic restoring force for bringing the shaft bearing sleeve 110a back in its central position, such that the central axis of the valve shaft assembly is in-line with the central axis C of the check valve 100 again.

In more general, according to an aspect of the present invention, at least a part of the shaft bearing body is mounted elastically in the radial direction to allow a limited displacement of the valve shaft assembly in the radial direction and/or a limited tilting of the central axis of the valve shaft assembly with regard to the central axis C.

Manufacturing tolerances and/or wear can lead to a slight misalignment of the valve shaft assembly with regard to the valve seat 81. This might impair the proper sealing between the valve head 125 and the valve seat 81. With the above modification, the position of the valve head 125 automatically adapts to the position of the valve seat 81 and compensates such misalignment when the check valve 100 closes. This improves the sealing between the valve head 125 and valve seat 81. The elastic O-rings 142 also compensate for different thermal dilatation of the shaft bearing sleeve 110a and the body holder 82.

The end cover 110b has an at least substantially mushroom-like shape. It is mounted to a distal end of the shaft bearing sleeve 110a. The end cover 110b may also be axially and/or rotationally fixed directly to the body holder 82. In more detail, it is rotationally and axially fixed to the shaft bearing sleeve 110a in this embodiment. The end cover 110b with the insert 145 constitutes a distal part (downstream-side part) of the shaft bearing body. They also constitutes the proximal side of the damping reservoir 50. The spring seat 51 for the spring 60 is formed on the end cover 110b.

The end cover 110b further comprises a central mounting passage. The insert 145 is mounted in the central mounting passage. The insert 145 is axially and radially fixed to the end cover 110b. Helical grooves 141 are provided at an outer circumferential surface of the insert 145. Seen in the axial direction A, each helical groove 141 comprises an inner end opening at a distal end of the insert 145 and an outer end opening at a proximal end of the insert 145 (at the side of the outlet 84 of the check valve 100). Thus, a groove portion is formed at the outer circumferential surface of the insert 145. Refrigerant flowing between the damping reservoir 50 and the outside 70 of the shaft bearing body has to pass through an entire length of the helical grooves 141. Again, the damping characteristics of the check valve 100 are independent from an axial position of the valve shaft 120 and the valve head 125.

Each helical groove 141 constitutes a single channel and constitutes a fluid connection between the damping reservoir 50 and the outside 70. Each channel is confined by side surfaces of the respective helical groove 141 and is covered by the counterpart surface facing said helical groove 141. In this case, the counterpart surface is the inner circumferential side of central mounting passage of the end cover 110b.

Again, the helical grooves 141 are arranged in parallel such that the fluid passes all helical grooves 141 in parallel at the same moment when flowing between the damping reservoir 50 and the outside of the shaft bearing body (compare to outside 70 in FIG. 1). In other words, the fluid flow between the damping reservoir 50 and the outside 70 is split up into all parallel helical grooves 141.

In this embodiment, in more detail, two helical grooves 141 are provided at the outer circumferential surface of the insert 145. The two helical grooves 141 are offset by 180°. Each helical groove 141 has a depth of 0.65 mm (in a radial direction of the valve shaft 120) and a width of 0.8 mm (in an axial direction of the valve shaft 120). In particular, said width may be an opening width at a radially outer, open side of the respective helical groove 141. The cross-sectional shape of the helical grooves 141 may be tapered along the radial direction from the open side to a radially inner side of the helical groove 141. The width at the radially inner side may be less, for example 0, 57 mm. Two sidewalls of each individual groove 141 may be tilted symmetrically by 10° with respect to radial direction of the valve shaft 120, for example. Furthermore, each helical groove 141 has 13 revolutions and a length of approximately 320 mm. An radially outer diameter of the helical grooves 141 is 8.6 mm.

In FIG. 4 and FIG. 5, an orientation of the axial direction A is parallel to a direction of gravity. Hence, gravity forces the moving parts (the shaft assembly) of the check valve 100 away from the valve seat 81. The spring 60 has to overcome the gravitational force of the valve shaft assembly additionally to close the check valve 100.

Again, the shaft bearing body, the valve shaft 120, and the valve head 125 are at least substantially rotationally symmetric. This facilitates the manufacture of the check valve 100.

The body holder 82 is made of an aluminum alloy. The valve shaft 120 may be coated. For example, the coating may comprise or consist of nickel, molybdenum disulfide, and polytetrafluoroethylene (PTFE). This reduces friction and reduces wear.

The check valve 100 is especially adapted for low-pressure refrigerants, for example R-1234ze or R-513A.

When a low-pressure refrigerant is used, a larger volume flow (unit $m^3/s$) has to be passed through the compressor unit 200 for obtaining the same power capability of the refrigeration system compared to the situation if a high-pressure refrigerant is used. Hence, the check valve 100 is of bigger size and adapted for larger volume flows compared to the check valve 1.

If the check valve 100 is an open state, for example in the fully open state depicted in FIG. 5, fluid can enter the check valve unit 100 through the fluid inlet 83 of the housing 180, pass between the valve seat 81 and sealing surface 33 and further through the flow passage 85 constituted between an outer wall of the housing 80 and an outer wall of the body holder 81 to a fluid outlet 84 of the housing 80. Said flow passage 85 extends round about the body holder 82. Seen in a circumferential direction perpendicular to the axial direction A, the flow passage 85 is only interrupted by the three support arms 86.

A minimum flow cross-section within the check valve 100 is between 80% and 95% of its port area. This reduces the flow resistance, the pressure drop, and hence increases the efficiency of the check valve 100. In this embodiment, the minimum flow cross-section within the check valve 100 is between the sealing holder 131 and the inner surface of the housing 180.

Furthermore, the check valve 100 comprises a further diffusor portion. Said further diffusor portion extends from the minimum flow cross-section to the outlet 84. In this region, the flow cross-section continuously and gradually increases along the forward flow direction. Hence, the flow velocity of the refrigerant is further reduced and the corresponding kinetic energy is at least partly converted into a further increase of the static pressure of the refrigerant. Consequently, the diffusor portion 222 of the fluid connection 220 can be shortened and the whole discharge unit becomes smaller.

The check valve 100 has a closing time of 0.7 s. As the port diameter W (inlet diameter) at the inlet 83 is 64 mm, the closing parameter (closing time divided by the port area) is 218 s/m². Hence, the check valve 100 is not prone to valve flutter. Furthermore, the damping is strong enough to prevent hard check valve slam, which otherwise could damage the check valve 100.

On the other hand, the corresponding closing time of 0.7 s is short enough to prevent considerable check-valve surge and to prevent strong deep compressor surge. Hence, the damping of the check valve 100 prolongs both the lifespan of the compressor 201 and the check valve 100 itself.

As the check valve 1, the check valve 100 has a flow-optimizing structure. For example, the check valve 100 has the central unit, wherein the central unit is configured such that it has a drop-like outer shape when the check valve 100 is fully open. In this embodiment, the central unit comprises the valve head 125, the body holder 82 and the shaft bearing body, in particular the end cover 110*b* of the shaft bearing body. Therefore, the flow resistance for the refrigerant flowing through the check valve around the central unit is very low when the check valve is fully open. This increases the energy efficiency of the check valve 100 and hence the compressor unit 200.

In even more detail, the check valve 100 is formed such that a flow velocity vector of the refrigerant flowing through the fully open check valve 100 is never larger than 45° with respect to the central axis C. This reduces the energy loss considerably.

Within the check valve 100, there are no sharp edges or steps disturbing the flow of the refrigerant when the check valve 100 is fully open. Apart from the support arms 86, there are no sharp edges or steps on an inner surface of the housing 110 between the inlet 83 and the outlet 84. At least when the check valve 100 is fully open, apart from the support arms 86, there are no sharp edges or steps on the outside on an outer surface of the central unit between the inlet 83 and the outlet 84. This especially is true for the flow channel 85.

It should be noted that there are different sealing surface for the check valve 100 and the ball valve 260. The check valve 100 has the sealing element 32 with the sealing surface 33, whereas the ball valve includes the two sealing rings 268. Each of the two sealing rings 268 has a sealing surface abutting and sealing against the ball 262. In the compressor unit 200 according to FIG. 3, the check valve 100 and the ball valve 260 are completely separate assemblies, which are independent from each other.

When the compressor 201 is in operation, the refrigerant having the low inlet pressure is sucked from a low-pressure side of the refrigeration system into the compressor 201 through the compressor inlet 203. The refrigerant then flows straight ahead along the axial direction of the compressor shaft 209 and centrally in the corresponding radial direction from the compressor inlet 203 to the first impeller 206. This results in a good inflow characteristic and high efficiency of the compressor 201.

The first impeller 206 accelerates the refrigerant and guides it radially away from the central axis of the compressor shaft 209. Thereby, a flow velocity of the refrigerant increases. The first impeller 206 adds kinetic energy to the refrigerant. After the first impeller 206, the flow velocity of the refrigerant is at least partly converted to increase static pressure of the refrigerant. Then, the refrigerant enters the second stage 207. The second impeller 208 again adds kinetic energy to the refrigerant again. A least a part of the added kinetic energy is converted to further increase the static pressure of the refrigerant. The compressed refrigerant leaves the compressor 201 through the discharge outlet 204 with increased flow velocity and increased static pressure.

The discharged refrigerant enters the fluid connection 220 from the discharge outlet 204 to the inlet 83 of the check valve 100 at the inlet 221 of the fluid connection 220. When the ball valve 260 (the additional stop mechanism) is open, it flows through the ball valve 260 into the conduit 231 with the diffusor portion 222. Within the diffusor portion, the flow velocity (unit m/s) of the decreased while the fluid flows along a forward flow direction F. Thereby, at least a part of the remaining additional kinetic energy, which has been added by the compressor, is converted in further increasing the static pressure of the refrigerant.

At the end of the conduit 231 and hence at the end of the elbow, the refrigerant arrives at the inlet 83 of the check valve 100 and flows into the latter. In FIG. 4 and FIG. 5, the check valve 100 is fully open. The flowing refrigerant passes between the valve head 125 and the housing 110 of the check valve, in particular between the sealing surface 33 of the sealing element 32 and the valve seat 81 of the housing 110. The refrigerant further flows through the flow passage 85 between the housing 110 and the body holder 82 along the forward flow direction.

As noted above, the check valve 100 comprises a further diffusor portion. Hence, the flow velocity of the refrigerant is further decreased at the outlet of the check valve 84, whereas the static pressure of the refrigerant is further increased.

Finally, the refrigerant leaves the outlet 84 of the check valve 100 and enters into an interior of the inlet port 400 of the refrigeration system. The compressed refrigerant with increased pressure is now available for the high-pressure side of the refrigeration system.

In a modification of the compressor unit 200, the check valve 1 is used instead of the check valve 100.

Figure 7:
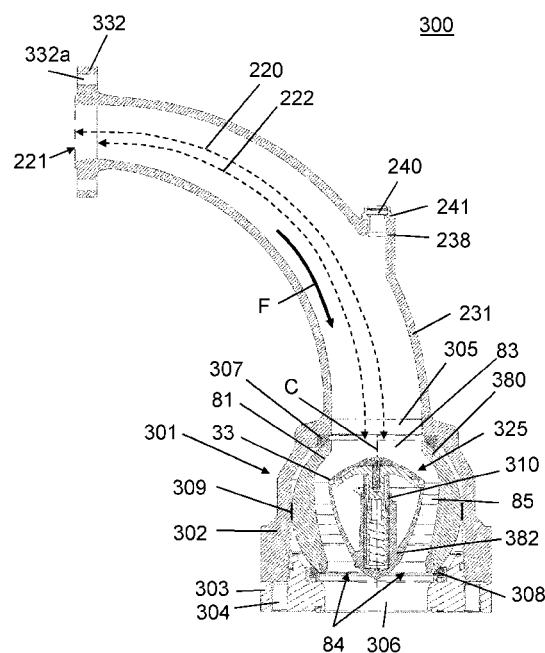
FIG. 7 is a cross-sectional view of a modified discharge unit for the compressor unit of FIG. 2 according to the present invention, wherein the discharge unit comprises a combined valve unit, wherein the combined valve unit includes a ball valve and an check valve that is integrated within the ball of the ball valve.
Figure 8:
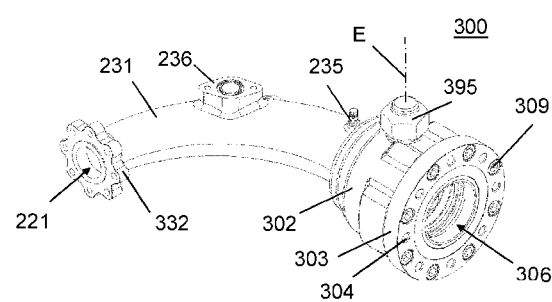
FIG. 8 is a perspective view of the discharge unit of FIG. 7.
Figure 9:
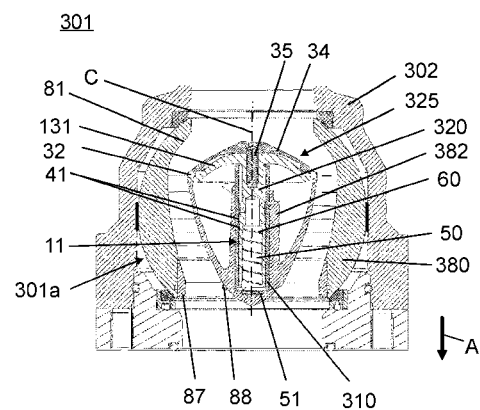
FIG. 9 is an enlarged section of FIG. 7 with the combined valve unit.

FIG. 7 is a cross-sectional view of a modified discharge unit 300 for the compressor unit 200 of FIG. 3, wherein the discharge unit 300 comprises a combined valve unit 301 including both a check valve and an additional stop mechanism. The discharge unit according to FIG. 3 can be replaced by the discharge unit 300. FIG. 8 shows a perspective view of the discharge unit 301. FIG. 9 is an enlarged section of FIG. 7 and shows the combined valve unit 301 in more detail.

The discharge unit 300 is adapted to be fixed directly to the compressor 201 (without the additional ball valve 260 in-between). If the discharge unit 300 is fixed to the compressor 201, this constitutes a modified compressor unit.

Elements corresponding to those of the embodiments and modifications described before are denoted by the same reference signs and are not described again. The descriptions, modifications and advantages apply accordingly with respect to the discharge unit 300 and the compressor unit comprising the discharge unit 300. Parts having the same names but different reference signs may be identical to the corresponding parts of the check valve 1 except the differences that are described and/or are necessary.

The discharge unit 300 includes the conduit 231 and the combined valve unit 301. A main outer housing 302 of the combined valve unit 301 is formed integrally with the conduit 231. In this example, an upstream-side end (with regard to the forward flow direction F) of the conduit 231 comprises a flange 332 for fixing the conduit 231 detachably to the compressor 201. In particular, the conduit 231 is detachably fixed directly to the compressor 201 such that the discharge outlet 204 of the compressor 201 opens directly into the inlet 221 of the fluid connection 220 of the discharge unit 300.

The flange 332 comprises six through holes 332a for bolts (not shown). The bolts can be inserted into the through holes 332a of the flange 332 of the conduit 231 and can be screwed into corresponding screw holes in the housing 202 of the compressor 202. By this, the discharge unit 300 can be detachably fixed to the compressor 201. In this embodiment, the diffusor portion 220 begins directly after the flange 332 (seen along the forward flow direction F).

In this embodiment, the inner diameter is 53.7 mm at the inlet 221, which corresponds to a flow cross-section of approximately 23 cm$^2$. The outlet of the conduit 231 is at the same time the inlet 305 of the combined valve unit 301. The inlet of the combined check valve 305 has a diameter of 90 mm. Hence, the flow cross-section at the inlet 305 of the combined valve unit 301 is 64 cm$^2$ (port area). The flow cross-section gradually increases in the diffusor portion 222 along the forward flow direction F by 180%. Sufficient kinetic energy of the refrigerant discharged by the compressor 201 is converted to additional static pressure. At the same time, the flow velocity of the refrigerant is considerably reduced. The flow velocity within the combined valve unit 301 is decreased. This allows a more uniform flow of the refrigerant through the combined valve unit 301. Finally, this decreases energy and pressure losses within the combined valve unit 301.

Like the discharge unit shown in FIG. 3, the discharge unit 300 of FIG. 7 also comprises the viewing window 240, the connector 235, and the staging flange 236. However, in this embodiment, there is no flat strut. However, in a modification of the discharge unit 300, a flat strut like the flat strut 234 may be integrally formed with the conduit 231.

An outer housing of the combined valve unit 301 includes the main outer housing 302 and an end cover ring 303. As noted above, the main outer housing 302 is formed integrally with the conduit 231. The end cover ring 303 is detachably fixed to a downstream-side end of the main outer housing 302. In this embodiment, the end cover ring 303 is fixed to the main outer housing 302 by means of bolts 309 (see FIG. 8). Furthermore, the end cover ring 303 comprises screw holes 304, which can be used for fixing, for example, the inlet port 400 to the outer housing.

The combined valve unit 301 is a ball valve with an integrated check valve 301a. The integrated check valve 301a provides the check function. The combined valve unit 301 further includes an additional stop mechanism. The latter is featured by the ball valve function. The ball is, at the same time, a housing 380 of the integrated check valve 301a.

The indications that the combined valve unit 301 "is open" or "is closed" refer to the ball valve function unless stated otherwise. In particular, even when the combined valve unit 301 is open, the integrated check valve 301a may be closed and hence block refrigerant from flowing through the combined valve unit 301 at this moment.

The integrated check valve 301a is of similar structure than the check valve 1 of FIG. 1 and FIG. 2. For example, it also comprises the damping reservoir 50 and the helical grooves 41 on the valve shaft 20. Corresponding elements of the integrated check valve 301a are denoted by the same reference signs and are not described again. The descriptions, modifications and advantages apply accordingly. Parts having the same names but different reference signs may be identical to the corresponding parts of the check valve 1 except the differences that are described and/or are necessary.

In the integrated check valve 301a, the shaft bearing body is formed by a shaft bearing sleeve 310 and the body holder 382. In other words, the shaft bearing body is partly formed integrally with the body holder 382.

Again, the shaft bearing body, the valve shaft 320, and a valve head 325 are at least substantially rotationally symmetric. This facilitates the manufacture of the integrated check valve 301a. The valve shaft 320 is similar to the valve shaft 20 of the check valve 1 but has, like the valve shaft 120 of the check valve 100, no distal flange.

In FIG. 7 and FIG. 9, the support arms are not shown but are present. The spring seat 51 is formed in the body holder 382 in this embodiment. In this embodiment, the mounting ring 87 is additionally secured again accidental loosening by securing screws 88. Of course, such securing screws 88 can also be provided in the check valves 1 and 100.

The housing 380 of the integrated check valve 301a is completely inserted into the outer housing of the combined valve unit 301. In more detail, it is mounted in an interior of the main outer housing 302. The housing 380 can be rotated inside the outer housing in order to open and close the combined valve unit 301.

In FIG. 7 and FIG. 9, the combined valve unit 301 is in its fully open position. The ball is in a (rotational) position such that the inlet 83 of the integrated check valve 301a faces the inlet 305 of the combined valve unit 301 and that the outlet 84 of the integrated check valve 301a faces an outlet 306 of the combined valve unit 301. In other words, the integrated check valve 301a is turned such that its central axis C is parallel to the forward flow direction in the combined valve unit 301. In still other words, the central axis C is perpendicular to a flow cross-section of the inlet 305 and the outlet 306 of the combined valve unit 301. In addition, the integrated check valve 301a is fully open in FIG. 7 and FIG. 9.

The housing 380 of the integrated check valve 301a (and hence the complete integrated check valve 301a) can be rotated about a rotational axis E within the outer housing via a spindle (not shown). The spindle is fixed to the ball (housing 380) and extends to the outside through the main housing part 302, similar to the spindle 266 in the ball valve 260. In FIG. 8, an outer end of the spindle is covered by cap 395 to avoid unintentional change of the rotational position of the housing 380. Alternatively or additionally, a stop ring (not shown) may be detachably fixed to an outer end of the spindle to prevent unintentional rotation of the spindle and hence the housing 380.

Figure 10A:
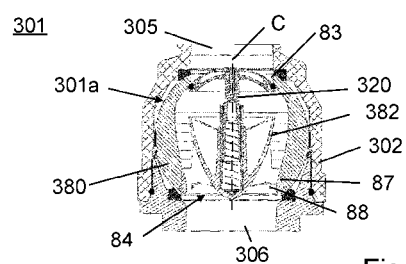
FIG. 10A is a cross-sectional view of a slightly modified version of the combined valve unit of FIG. 9, wherein the ball valve is fully open whereas the integrated check valve is closed.

FIG. 10A shows a slightly modified version of the combined valve unit 301 of FIG. 9 in a first state, in which the combined valve unit 301 is open (i.e. the ball valve function is open) and in which the integrated check valve 301a is closed. As the modifications between the versions of the combined vale unit 301 shown in FIG. 10A to 10C on the one hand and FIG. 9 on the other hand are minor and are not relevant to the present aspect, the same reference signs are used.

In other words, in the state shown in FIG. 10A, it depends on an opening/closing state of the integrated check valve 301a whether fluid can pass through though the combined valve unit 301 or not. As in FIGS. 7 and 9, the central axis C of the integrated check valve 301a is parallel to the forward flow direction in the combined valve unit 301 and perpendicular to a flow cross-section of the inlet 305 and the outlet 306 of the combined valve unit 301. The housing 380 of the integrated check valve 301a does blocks neither the inlet 305 nor the outlet 306 of the combined valve unit 301.

Figure 10B:
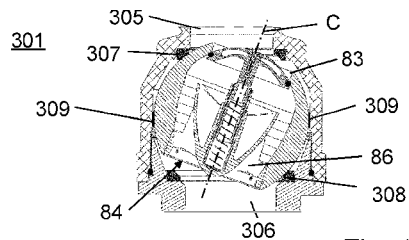
FIG. 10B shows the combined valve unit of FIG. 10A in a state, in which the ball is rotated about 20° within an outer housing of the combined valve unit.

In FIG. 10B, the complete integrated check valve 301 has been tilted by 20° from its position according to FIG. 10A. Corresponding, its central axis C is tilted 20° with respect to the forward flow direction in the combined valve unit 301. Starting from FIG. 10A, the combined valve unit 301 is being closed.

Figure 10C:
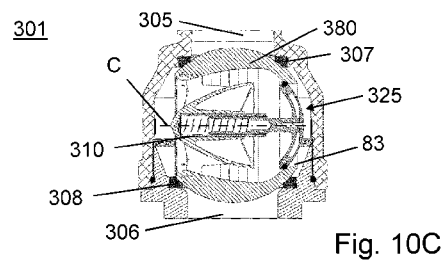
FIG. 10C shows the combined valve unit of FIG. 10A in state, in which the ball is rotated about 90° within the outer housing, such that the ball valve is closed.

In FIG. 10C, the combined valve unit is in a fully closed state. The housing 380 is turned by 90° with respect to the state in FIG. 10A. The central axis C of the integrated check valve 301a is perpendicular to the forward flow direction in the combined valve unit 301. In other words, the central axis C is parallel to the flow cross-section of the inlet 305 and the outlet 306 of the combined valve unit 301. In this fully closed state, the outer housing 380 (especially, a circumferential sidewall thereof) closes and blocks both the inlet 305 and the outlet 306 of the combined valve unit 301. No fluid can pass through the combined valve unit 301 in this state.

The combined valve unit 301 comprises two sealing rings 307, 308 for sealing between the housing 380 and the outer housing. The downstream-side sealing ring 308 is mounted in an annular recess, which is located at an inner surface the end cover ring 303. It is an annular PTFE seal with an additional O-ring back up. The latter prevents that too high torque is applied on the spindle by fixing the end cover ring 303. The upstream-side sealing ring 307 is an annular PTFE seal. It is mounted in an annular recess, which is located at an inner surface of the main outer housing 302. Both in the fully open state and in the fully closed state of the combined valve unit 301, the sealing rings 307, 308 respectively seal against an outer surface of the housing 380. In detail, the additional stop mechanism comprises the main outer housing 302, the end cover ring 303, the sealing rings 307, 309, and 309, and the housing 380 of the integrated check valve 301a.

In this embodiment, the combined valve unit 300 comprises an optional further sealing ring 309 for sealing between the outer housing and the housing 380. Seen along the forward flow direction F, the sealing ring 309 is located between the sealing rings 307, 308, preferably at least substantially in the middle thereof. The additional sealing ring 309 ensures tight sealing even when the housing 380 is in intermediate positions between the fully open state (see FIG. 7 and FIG. 9) and a fully closed state (see FIG. 10C; the integrated check valve 301a is turned by 90°).

The effect of the further sealing ring 309 is evident from FIG. 10B. In this intermediate state, the housing 380 does not sealingly abut on a whole inner circumference of the sealing ring 307. Similarly, the housing 380 does not sealingly abut on a whole inner circumference of the other sealing ring 308 in this intermediate state. Hence, small amounts of fluid could pass through the combined check valve unit 301 in this intermediate state, in particular between an outer surface of the housing 380 and an inner surface of the outer housing. This is prevented by the additional sealing ring 309. In general, independent from a rotational state of the integrated check valve 301a, the outer surface of outer housing 380 of the integrated check valve 301a always sealingly abuts on a whole circumference of at least one sealing.

The inlet 83 of the integrated check valve 301a has the same diameter and flow cross-section as the inlet 305 of the combined valve unit 301. A minimum flow cross-section within the integrated check valve 301a is formed between valve head 325 and the inner sider of the housing 308. The minimum flow cross-section may be in the range from 80% to 95% of the flow cross-section at the inlet 83. This ensures a low pressure drop and a good efficiency while maintaining a compact size. At the end outlet 84 of the integrated check valve 301a, the flow cross-section is 25% larger than the flow cross-section at the inlet 83. Hence, the integrated check valve 301a also acts as a further diffusor portion when the combined check valve 301 and the integrated check valve 301a are fully open. As the check valve 100, the integrated check valve 301a is formed that the flow velocity vector of the refrigerant flowing through the fully open integrated check valve 301a is never larger than 45° with respect to the central axis C.

The present invention enhances the reliability, the efficiency, and the operational range of the compressor unit 200 and reduces unpleasant noises.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A compressor unit for a refrigeration system using a refrigerant, wherein the compressor unit comprises
    a centrifugal compressor for compressing the refrigerant, wherein the compressor has a discharge outlet for discharging the compressed refrigerant; and
    a check valve, wherein an inlet of the check valve is in fluid connection with the discharge outlet of the compressor;
    wherein the check valve is a nozzle check valve including a damping mechanism, wherein a closing parameter of the check valve is between 50 s/m$^2$ and 2000 s/m$^2$, wherein the closing parameter is a closing time of the check valve divided by a port area of the check valve.

2. The compressor unit according to claim 1, wherein an internal volume of a fluid connection from the discharge outlet of the compressor to the inlet of the check valve is in the range from 0.002 m$^3$ to 0.020 m$^3$.

3. The compressor unit according to claim 1, wherein the closing parameter of the check valve is between 100 s/m$^2$ and 1000 s/m$^2$.

4. The compressor unit according to claim 1, wherein the compressor is a centrifugal turbo compressor.

5. The compressor unit according to claim 1, wherein the compressor is a lubricant-free compressor including a magnetic bearing system for a compressor shaft,
   wherein the magnetic bearing system includes at least one magnetic axial bearing and at least one magnetic radial bearing,
   wherein the bearing system includes a sensor system for monitoring a position of the compressor shaft at least 1000 times per second,
   wherein the at least one magnetic axial bearing and the at least one magnetic radial bearing are controlled based at least on an output of the sensor system, and
   wherein the bearing system is configured for active clearance adjustment for the bearings for the compressor shaft.

6. The compressor unit according to claim 1, wherein the fluid connection from the discharge outlet of the compressor to the inlet of the check valve comprises a diffusor portion.

7. The compressor unit according to claim 1, wherein the compressor unit comprises a viewing window that allows viewing from the outside into an interior of the fluid connection from the discharge outlet of the compressor to the inlet of the check valve.

8. The compressor unit according to claim 1, wherein the compressor unit comprises an additional stop mechanism to close a fluid connection from the discharge outlet of the compressor to an outlet of the check valve in addition to a check function of the check valve.

9. The compressor unit according to claim 8, wherein the compressor unit comprises different sealing surfaces for the check function and the additional stop mechanism.

10. The compressor unit according to claim 8,
    wherein the compressor unit comprises a ball valve in the fluid connection from the discharge outlet of the compressor to the inlet of the check valve or
    wherein the compressor unit comprises a combined valve unit, wherein the combined valve unit includes both the check valve and the additional stop mechanism.

11. The compressor unit according to claim 1, wherein a mass parameter of the check valve is between 10 kg/m$^2$ and 60 kg/m$^2$, wherein the mass parameter is a mass of a valve shaft assembly of the check valve divided by the port area of the check valve.

12. The compressor unit according to claim 1, wherein the check valve comprises
    a shaft bearing body comprising an at least substantially cylindrical mounting portion extending along an axial direction of the check valve;
    a valve shaft mounted in the mounting portion, wherein the valve shaft extends along the axial direction and is displaceable along the axial direction;
    a valve head comprising a sealing surface, wherein the valve head is disposed on a distal end of the valve shaft in the axial direction, the distal end facing away from the mounting portion; and
    a damping reservoir inside the shaft bearing body, wherein a volume of the damping reservoir is changed by movement of the valve shaft with regard to the shaft bearing body along the axial direction.

13. The compressor unit according to claim 12, wherein the shaft bearing body comprises a shaft bearing sleeve, wherein the shaft bearing sleeve is at least axially fixed to a housing of the check valve and comprises the mounting portion.

14. A refrigeration system, wherein the refrigeration system comprises a compressor unit according to claim 1.

15. The compressor unit according to claim 2, wherein the closing parameter of the check valve is between 100 s/m$^2$ and 1000 s/m$^2$.

16. The compressor unit according to claim 2, wherein the compressor is a centrifugal turbo compressor.

17. The compressor unit according to claim 3, wherein the compressor is a centrifugal turbo compressor.

18. The compressor unit according to claim 2, wherein the compressor is a lubricant-free compressor including a magnetic bearing system for a compressor shaft,
    wherein the magnetic bearing system includes at least one magnetic axial bearing and at least one magnetic radial bearing,
    wherein the bearing system includes a sensor system for monitoring a position of the compressor shaft at least 1000 times per second,
    wherein the at least one magnetic axial bearing and the at least one magnetic radial bearing are controlled based at least on an output of the sensor system; and
    wherein the bearing system is configured for active clearance adjustment for the bearings for the compressor shaft.

19. The compressor unit according to claim 3, wherein the compressor is a lubricant-free compressor including a magnetic bearing system for a compressor shaft,
    wherein the magnetic bearing system includes at least one magnetic axial bearing and at least one magnetic radial bearing,
    wherein the bearing system includes a sensor system for monitoring a position of the compressor shaft at least 1000 times per second,
    wherein the at least one magnetic axial bearing and the at least one magnetic radial bearing are controlled based at least on an output of the sensor system; and
    wherein the bearing system is configured for active clearance adjustment for the bearings for the compressor shaft.

\* \* \* \* \*